(12) United States Patent
Barrow et al.

(10) Patent No.: US 11,847,204 B2
(45) Date of Patent: Dec. 19, 2023

(54) SYSTEMS AND METHODS FOR CLOUD-BASED MANAGEMENT OF DIGITAL FORENSIC EVIDENCE

(71) Applicant: Magnet Forensics Inc., Waterloo (CA)

(72) Inventors: Martin Barrow, Sheffield (GB); William Lindsay, Kitchener (CA); Gayathiri Thananjagen, Waterloo (CA)

(73) Assignee: Magnet Forensics Inc., Waterloo, CA (US)

( * ) Notice: Subject to any disclaimer, the term of this patent is extended or adjusted under 35 U.S.C. 154(b) by 362 days.

(21) Appl. No.: 16/990,561

(22) Filed: Aug. 11, 2020

(65) Prior Publication Data

US 2021/0049264 A1 Feb. 18, 2021

Related U.S. Application Data

(60) Provisional application No. 62/885,588, filed on Aug. 12, 2019.

(51) Int. Cl.
*G06F 21/53* (2013.01)
*G06F 9/455* (2018.01)
*G06F 21/57* (2013.01)

(52) U.S. Cl.
CPC .......... *G06F 21/53* (2013.01); *G06F 9/45558* (2013.01); *G06F 21/57* (2013.01); *G06F 2009/4557* (2013.01); *G06F 2009/45595* (2013.01)

(58) Field of Classification Search
CPC ...... G06F 21/53; G06F 9/45558; G06F 21/57; G06F 2009/4557; G06F 2009/45595; G06F 21/552; G06Q 50/26; H04L 63/308
See application file for complete search history.

(56) References Cited

U.S. PATENT DOCUMENTS

| | | | |
|---|---|---|---|
| 6,973,491 B1 | 12/2005 | Staveley et al. | |
| 8,355,922 B1 | 1/2013 | Sonie | |
| 10,257,216 B2* | 4/2019 | Bußer | H04L 63/1425 |
| 2009/0164522 A1 | 6/2009 | Fahey | |
| 2011/0153748 A1* | 6/2011 | Lee | H04L 67/125 |
| | | | 709/205 |
| 2011/0321124 A1 | 12/2011 | Kisin et al. | |
| 2012/0191660 A1* | 7/2012 | Hoog | H04L 63/1433 |
| | | | 709/224 |
| 2012/0209983 A1* | 8/2012 | Bronner | G06F 9/4843 |
| | | | 709/224 |
| 2015/0254109 A1 | 9/2015 | Chandramouli et al. | |

(Continued)

FOREIGN PATENT DOCUMENTS

EP 3062243 8/2016

OTHER PUBLICATIONS

Mezodi, Stephan, Extended European Search Report, European Patent Application No. 20190755.7, dated Dec. 21, 2020, 6 pages, Munich, Germany.

(Continued)

*Primary Examiner* — Trong H Nguyen
(74) *Attorney, Agent, or Firm* — Woods Oviatt Gilman LLP; Dennis B. Danella, Esq.

(57) ABSTRACT

Systems and methods for cloud-based management of digital forensic evidence and, in particular, to systems and methods for enabling cloud-based digital forensic investigations.

22 Claims, 13 Drawing Sheets

(56) References Cited

U.S. PATENT DOCUMENTS

| | | | | |
|---|---|---|---|---|
| 2015/0304289 A1* | 10/2015 | Cho | .................... | H04L 63/126 |
| | | | | 713/153 |
| 2015/0326618 A1* | 11/2015 | Lim | .................... | G06F 21/64 |
| | | | | 726/27 |
| 2016/0020959 A1* | 1/2016 | Rahaman | .................... | H04L 63/308 |
| | | | | 709/224 |
| 2016/0078240 A1* | 3/2016 | Kang | .................... | G06F 21/64 |
| | | | | 726/31 |
| 2016/0149938 A1* | 5/2016 | Barak | .................... | H04L 63/1416 |
| | | | | 726/23 |
| 2017/0161501 A1* | 6/2017 | Sood | .................... | G06F 9/45533 |
| 2017/0277662 A1* | 9/2017 | Saliba | .................... | G06F 16/168 |
| 2018/0307833 A1* | 10/2018 | Noeth | .................... | H04L 43/062 |
| 2019/0236346 A1* | 8/2019 | Barone | .................... | H04W 4/38 |
| 2020/0202008 A1* | 6/2020 | Pfleger de Aguiar | .................... | |
| | | | | G06F 11/3485 |
| 2021/0011999 A1* | 1/2021 | Bennett | .................... | G06F 16/1734 |

OTHER PUBLICATIONS

Mezodi, Stephan, Communication pursuant to Article 94(3) EPC, European Patent Application No. 20190755.7, dated Apr. 22, 2022, 5 pages, Munich, Germany.

* cited by examiner

FIG. 9

SYSTEMS AND METHODS FOR CLOUD-BASED MANAGEMENT OF DIGITAL FORENSIC EVIDENCE

CROSS-REFERENCE TO RELATED APPLICATION

This application claims the benefit of U.S. Provisional Patent Application No. 62/885,588, filed Aug. 12, 2019, the entire contents of which are hereby incorporated by reference.

FIELD

The described embodiments relate to systems and methods for cloud-based management of digital forensic evidence and, in particular, to systems and methods for enabling cloud-based digital forensic investigations.

BACKGROUND

Due at least to the substantial computing resources required for digital forensic investigations, traditional methods of digital forensic investigations require storage devices containing digital forensic data to be sent to forensic labs in order to be analyzed. There is also limited experienced investigators globally. As a result, there is often an extended delay between obtaining the digital data and analyzing the digital data. Individuals responsible for crimes involving digital forensic data are increasingly difficult to identify and apprehend due at least to continuously evolving technologies that enable digital data to be generated and disseminated nearly instantly and, to some degree, anonymously, and the ease of international travel. The ability to obtain and analyze digital forensic data seamlessly and with minimal delay is increasingly critical for containing crimes involving digital data, such as child exploitation material.

SUMMARY

The various embodiments described herein generally relate to methods (and associated systems configured to implement the methods) for cloud-based management of digital forensic evidence.

In accordance with an embodiment, there is provided a forensic investigation system for conducting a distributed digital forensic workflow. The system includes: one or more agent computing devices comprising: at least one data-collecting agent device operable to collect digital forensic data; at least one processing agent device operable to conduct at least a portion of the distributed digital forensic workflow; a central computing device for managing the operation of the one or more agent computing devices for conducting the distributed digital forensic workflow, the central computing device operable to communicate with the one or more agent computing devices via at least one data communication network; and a data storage device for storing the digital forensic data collected by the at least one data-collecting agent device.

In some embodiments, the one or more agent computing devices includes at least one virtual computing device accessible by the central computing device via a gateway or virtual private network.

In some embodiments, the one or more agent computing devices includes a cloud-based virtual platform. The cloud-based virtual platform can be implemented with AMAZON WEB SERVICES™.

In some embodiments, the central computing device is operable to allocate the one or more agent computing devices based on a priority status of a forensic investigation associated with the collected digital forensic data.

In one broad aspect, there is provided a forensic investigation system for conducting distributed digital forensic processing, the system including: one or more agent computing devices including: at least one data-collecting agent device operable to collect digital forensic data; and at least one processing agent device operable to conduct at least a portion of the distributed digital forensic processing on the digital forensic data; a central computing device for managing the operation of the one or more agent computing devices for conducting the distributed digital forensic workflow, the central computing device operable to communicate with the one or more agent computing devices via at least one data communication network; and a data storage device for storing the digital forensic data collected by the at least one data-collecting agent device.

In some cases, the central computing device is operable to allocate the one or more agent computing devices based on a priority status of a forensic investigation associated with the collected digital forensic data.

In some cases, the at least one data-collecting agent device is preconfigured to collect the digital forensic data from a target device.

In some cases, the at least one data-collecting agent device is a target device.

In some cases, the at least one data-collecting agent device is remotely provisioned to be operable to collect the digital forensic data.

In some cases, following remote provisioning, the central computing device is operable to transmit one or more commands to the at least one data-collecting agent device to collect the digital forensic data.

In some cases, in response to receiving the one or more commands, the at least one data-collecting agent device is operable to collect the digital forensic data and transmit the digital forensic data.

In some cases, the at least one data-collecting agent device transmits the digital forensic data to the central computing device.

In some cases, the at least one data-collecting agent device transmits the digital forensic data to the data storage device.

In some cases, the one or more agent computing devices further comprise at least one virtual computing device.

In some cases, the at least one virtual computing device is accessible by the central computing device via a virtual private network.

In another broad aspect, there is provided a method of conducting distributed digital forensic processing, the method including: providing one or more agent computing devices; providing a central computing device, the central computing device operable to communicate with the one or more agent computing devices via at least one data communication network; collecting digital forensic data via the at least one data-collecting agent device; storing the digital forensic data collected by the at least one data-collecting agent device; and conducting at least a portion of the distributed digital forensic processing on the digital forensic data at at least one processing agent device.

In some cases, the method further comprises the central computing device allocating the one or more agent computing devices based on a priority status of a forensic investigation associated with the collected digital forensic data.

In some cases, the method further comprises preconfiguring the at least one data-collecting agent device to collect the digital forensic data from a target device.

In some cases, the at least one data-collecting agent device is a target device.

In some cases, the method further comprises remotely provisioning the at least one data-collecting agent device to collect the digital forensic data.

In some cases, following remote provisioning, the central computing device is operable to transmit one or more commands to the at least one data-collecting agent device to collect the digital forensic data.

In some cases, the at least one data-collecting agent device collects the digital forensic data and transmits the digital forensic data in response to receiving the one or more commands.

In some cases, the at least one data-collecting agent device transmits the digital forensic data to the central computing device.

In some cases, the at least one data-collecting agent device transmits the digital forensic data to the data storage device.

In some cases, the one or more agent computing devices further comprise at least one virtual computing device.

In another broad aspect, there is provided a non-transitory computer readable medium storing computer program instructions executable by at least one computer processor, which when executed by the at least one computer processor, cause the at least one computer processor to carry out the methods substantially as described herein.

BRIEF DESCRIPTION OF THE DRAWINGS

Several embodiments will now be described in detail with reference to the drawings, in which:

FIG. 9 is a graphical user interface for a forensic data investigation application in accordance with another example embodiment;

Figure 1:
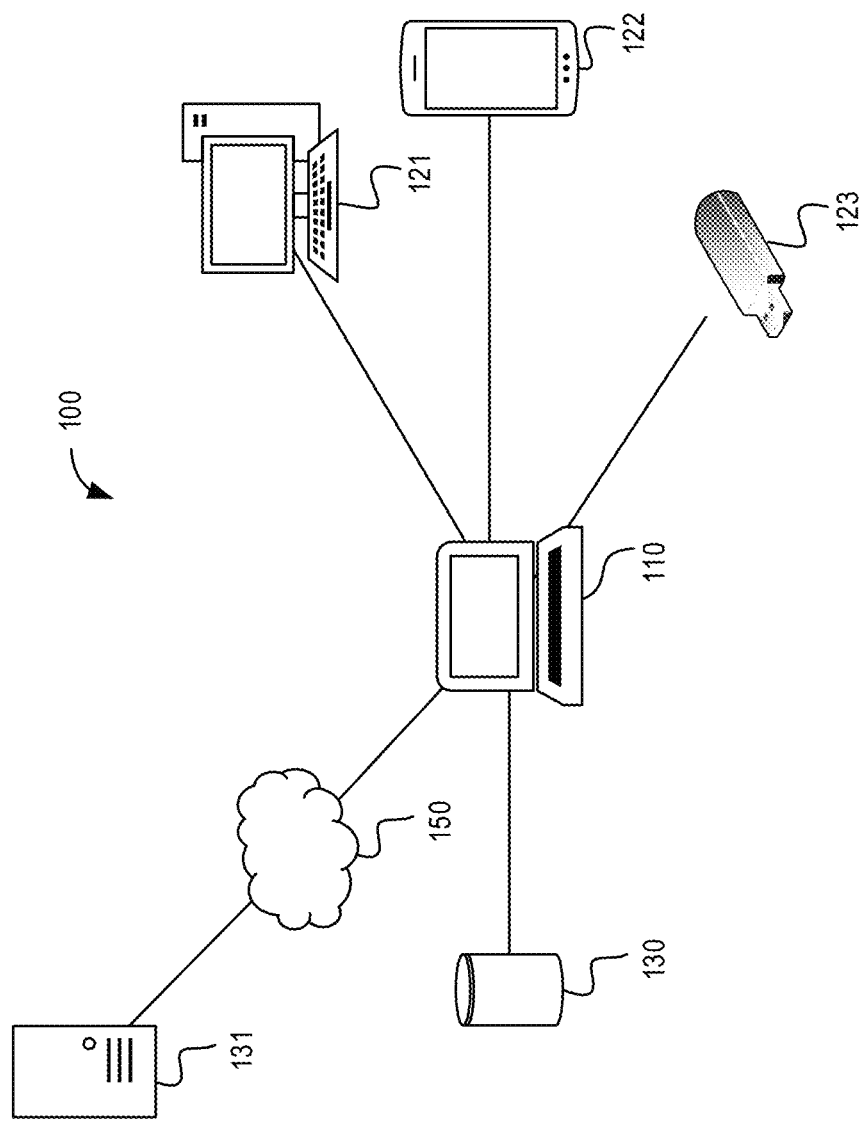
FIG. 1 is a block diagram of a digital forensic data investigation system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Traditional methods of digital forensic investigations are often confined within forensic labs due at least to the substantial computing resources required. The number of experienced investigators available globally is also limited. Due to the limited resources and transport time of the storage devices containing the forensic data, there can be significant delays between when digital forensic data is obtained (e.g., at a crime scene or port of entry) and when the digital forensic data can be analyzed using forensic data systems. Any delay in forensic data investigations can significantly reduce the chances of apprehending individuals responsible for crimes involving digital forensic data, especially with the growing ease of international travel. In today's digital age, the ability to obtain and analyze digital forensic data seamlessly and with minimal delay is increasingly critical for containing crimes involving digital data, such as child exploitation material, since digital data can now be generated and disseminated nearly instantly.

Historically, the investigation tools were limited to exploring data items as recovered from a target device filesystem. That is, only the files and folders present on the target device could be examined forensically. In some cases, raw data could also be examined. This, thus, created a significant burden on investigators to both understand where files of interest may be located on a filesystem, and also to examine a large quantity of files for evidence of interest. For example, forensic data investigation tools have included refining tools capable of identifying and extracting "artifacts" that may be of interest regardless of the underlying data location within a filesystem. In some cases, the artifacts may comprise data extracted from within particular files, or pulled from locations scattered across multiple files. The artifacts may be stored in a forensic database, as records of the data fragments from which they are generated. Generally, these fragment records are composed of metadata about the underlying source data and an indication of where the source data can be retrieved. However, in some cases, the fragment records may contain some or all of the original source data.

For example, an artifact can be created for an instant messenger chat history. The history may subsist in multiple files in a filesystem but, by using preconfigured refining tools, a complete history artifact can be generated for presentation to the investigator in a single view. This greatly enhances efficiency, usability and comprehension. Heretofore, refining tools within forensic data investigation tools have been pre-programmed in the forensic data investigation software itself, and therefore their use has been limited only to certain well-defined and widely-used types of artifacts. Examples include, but are not limited to:

Uniform resource locators (URLs) in known formats, which can be parsed from a variety of sources, such as other documents, web browser histories, e-mails, chat messages;

Web browser cookies, bookmarks, cache files, passwords and autofill data, history data, search queries, downloaded web pages, for known web browser versions;

Instant messenger chat logs for known software;

Call logs for certain models of phone;

Cached network files (e.g., from popular cloud-based file storage services);

Photos stores by popular photo catalog software;

E-mail messages and attachments from known e-mail clients, which may be stored in monolithic database files or obfuscated files specific to a particular e-mail client software;

Peer-to-peer (P2P) file sharing history of popular P2P software;

Media files (including media files that were embedded in other file types);

Documents, such as word processor, spreadsheet, presentation and other documents by known software;

Operating system configuration files, such as user account information, peripheral information, system cache files, network interface data, installed software data, and still more, all of which may be stored in registry databases or other binary or text extensible markup language (XML) files.

However, even with a wide variety of known artifacts, new artifacts are constantly being developed and identified. For example, a refining module capable of identifying web browser histories generated by one web browser (Microsoft Internet Explorer™) generally is not capable of identifying web browser histories generated by a different web browser (e.g., MOZILLA FIREFOX™). In other instances, a module that works with one version of a browser (e.g., INTERNET EXPLORER™ 6) may cease to identify histories generated by a new version of the same web browser (e.g., INTERNET EXPLORER™ 9). Or a new web browser may be introduced, which uses a different format.

In other cases, investigators may wish to specify a type of artifact particular to a current investigation. For example, an investigator tasked with a corporate espionage investigation may wish to identify files generated by a proprietary software application that is not widely used or known. In still other cases, investigators may be unable to share the specification for a desired artifact with the forensic investigation software developer, due to secrecy or security concerns.

The embodiments described herein can enable a user of forensic data investigation tools to manage and access digital forensic evidence via a cloud-based system, thereby enabling seamless access to digital forensic data and minimizing delays associated with transporting the storage devices containing the forensic data to the forensic labs. The described embodiments also can enable multiple investigators to access the forensic data via the cloud-based system from various remote locations, thereby maximizing available forensic resources globally at the earliest opportunity.

Referring now to FIG. 1, there is provided a block diagram of a digital forensic data investigation system 100 in accordance with an example embodiment.

Data investigation system 100 generally comprises a computing device 110, which is coupled to a data storage device 130, and which optionally may be coupled to one or more target devices, such as a desktop computer 121, mobile device 122 and data storage device 123. Coupling may be achieved using a physical connection, such as a Universal Serial Bus (USB) connector or cable, an IEEE 802.3 (Ethernet) network interface, or other suitable coupling interface or adapter. Target devices may also be any type of data storage media, such as magnetic and solid state disk drives, optical media, or network file shares.

Computing device 110 has one or more software application as described herein. As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

In particular, computing device 110 is provided with a forensic data investigation software application, to acquire data from one or more target device. For example, the forensic data investigation software application may do a low-level block-based copy from a target device storage media, to retrieve all data on the device, regardless of whether attempts have been made to delete the data. In other cases, the forensic data investigation software application may simply copy files and folders using operating system-level file copy facilities. Specific techniques for forensic data retrieval from a target device will be known.

The forensic data investigation software application may analyze the retrieved data to identify data items of interest, as described herein. Generally, data items can represent any data that can be retrieved from target device storage media, such as files, databases, folders, block data or byte ranges, volume information, file images, and the like.

On their own, data items generally can be viewed using a text preview, which converts the raw data into a text representation (e.g., using ASCII or UTF encoding), or in a binary or hexadecimal representation. However, reviewing large amounts of data items in this format is time-consuming and difficult. Therefore, computing device 110 may generate a plurality of data artifacts.

Data artifacts are a type of data item that represents one or more other data items in a structured way. A simple form of data artifact can be created or "refined" based on the filename extension of a data item retrieved from the target device. For example, the computing device may generate a data artifact of type "documents" for a data item with a file extension of .DOCX. However, more advanced data artifacts can also be generated through the use of one or more refining modules. For example, the computing device may search for data patterns indicative of particular file types, such as media files, to generate media data artifacts or text data artifacts, respectively. Such generation of data artifacts can occur regardless of whether attempts have been made to obfuscate the nature of a particular file, for example, by changing a file extension or even deleting a file (where the underlying raw data can be recovered from unused space on the target device storage media).

Refining modules can be provided or defined for a wide variety of data artifacts. Some refining modules can be pre-programmed or pre-configured with the forensic data investigation software application. However, as described herein, one or more refining modules that are extensible can be provided, for example, by an end-user.

Some types of data items may be used to generate more than one data artifact. For example, an e-mail database may be used to generate a large number of data artifacts corresponding to individual e-mail messages.

Data items, including data artifacts, may be stored in a data collection once generated. The data collection can be an electronic database file stored in a data storage device 130. The electronic database file may be a relational database, such as MICROSOFT SQL SERVER™ or a non-relational database, such as a key-value database, NoSQL database, or the like. In some cases, a data collection may contain data items retrieved from more than one target device and, because data artifacts are a type of data item, the data collection may also contain data artifacts generated by the computing device. Each data item in the data collection may be tagged with information to identify the target device that is the source of the data item. In some cases, a data collection may contain only records of data artifacts or data items, along with indications of where the source data can be retrieved (e.g., on the target device).

Data storage device 130 is a non-volatile data store coupled to computing device 110. For example, data storage device 130 may be an external storage device coupled to computing device 110 locally, an internal device such as a hard drive. In some cases, computing device 110 may be coupled to a networked storage device 131 via a data communication network 150. Data communication network 150 can be a private data communication network, such as a local area network, wide area network or virtual private network (VPN), or may also be a public data communication network, such as the Internet. When computing device 110 is configured to access data storage device 130 over a public network, or even over a private network, encryption (e.g., Transport Layer Security) can be used to safeguard data. An example digital forensic data investigation system 100 which may involve a virtual private network will be described with reference to FIGS. 6 to 8.

In some cases, computing device 110 can be provided with a forensic data investigation application. In operation, the forensic data investigation application can be used to retrieve the data collection, e.g., from data storage device 130, and to generate a user interface to facilitate forensic investigation of the data collection.

Figure 2:
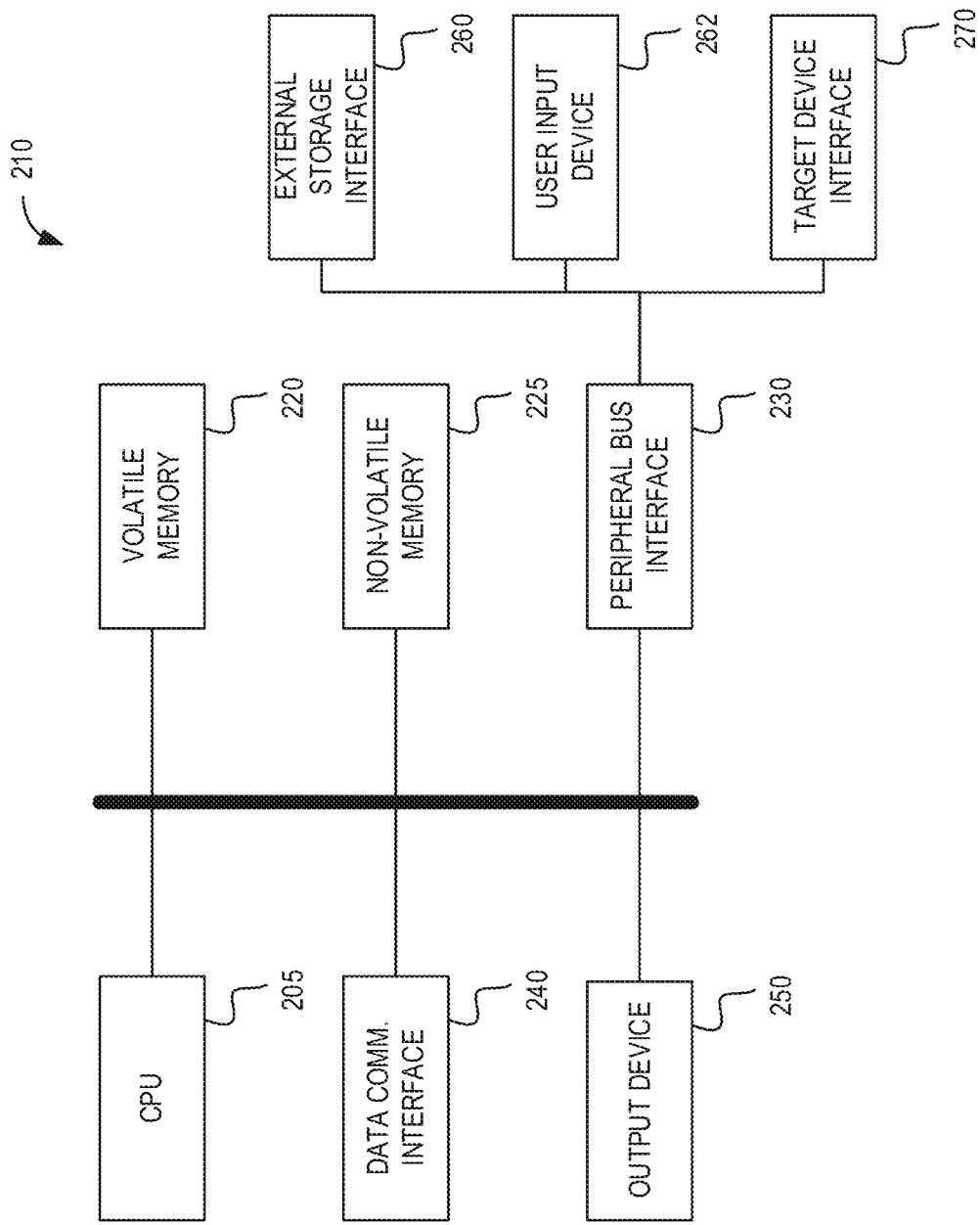
FIG. 2 is a simplified block diagram of a computing device in accordance with an example embodiment.

Referring now to FIG. 2, there is shown a simplified block diagram of a computing device 210 in accordance with an example embodiment. Computing device 210 is one example of a computing device 110 as described in FIG. 1.

Computing device 210 has a processor 205, which is coupled to a volatile memory 220, a non-volatile memory 225, a peripheral bus interface 230, a data communications interface 240, and an output device 250. The peripheral bus interface 230 may further couple processor 205 to an external storage interface 260, a user input device 262 and a target device interface 270. It will be appreciated that FIG. 2 is a simplified diagram of one example embodiment, and that various other arrangements and computer system architectures may be used. For example, in some embodiments, data communications interface 240 may be coupled to processor 205 via peripheral bus interface 230.

Processor 205 is a computer processor, such as a general purpose microprocessor. In some other cases, processor 205 may be a field programmable gate array, application specific integrated circuit, microcontroller, or other suitable computer processor.

Processor 205 is coupled, via a computer data bus, to volatile memory 220 and non-volatile memory 225. Non-volatile memory 225 stores computer programs consisting of computer-executable instructions, which may be loaded into volatile memory 220 for execution by processor 205 as needed. It will be understood by those skilled in the art that references herein to a computing device as carrying out a function or acting in a particular way imply that a processor (e.g., processor 205 of computing device 210) is executing instructions (e.g., a software program) stored in a memory and possibly transmitting or receiving inputs and outputs via one or more interface. Volatile memory 220 may also store data input to, or output from, processor 205 in the course of executing the computer-executable instructions. In some cases, non-volatile memory 225 may store a data collection.

Processor 205 is also coupled to an output device 250, such as a computer display, which outputs information and data as needed by various computer programs. In particular, output device 250 may display a graphical user interface (GUI) generated by computing device 210.

Processor 205 is coupled to data communications interface 240, which is one or more data network interface, such as an IEEE 802.3 or IEEE 802.11 interface, for communication over a network.

Processor 205 may be coupled to a peripheral bus interface 230 via a data bus. In other embodiments, peripheral bus interface 230 may be omitted and processor 205 may be coupled to devices such as external storage interface 260 directly via a data bus.

In the example embodiment, peripheral bus interface 230 is coupled to an external storage interface 260, for example, to interface with external storage device 130.

Peripheral bus interface 230 is also coupled to one or more user input device 260, such as a keyboard or pointing device.

Finally, peripheral bus interface 230 can be coupled to a target device interface 270, for interfacing with and retrieving data from one or more target devices, such as target device 121 of FIG. 1.

In some embodiments, computing device 210 is a desktop or portable laptop computer 130. In other embodiments, computing device 210 may be a mobile device such as a smartphone or tablet computer.

Figure 3:
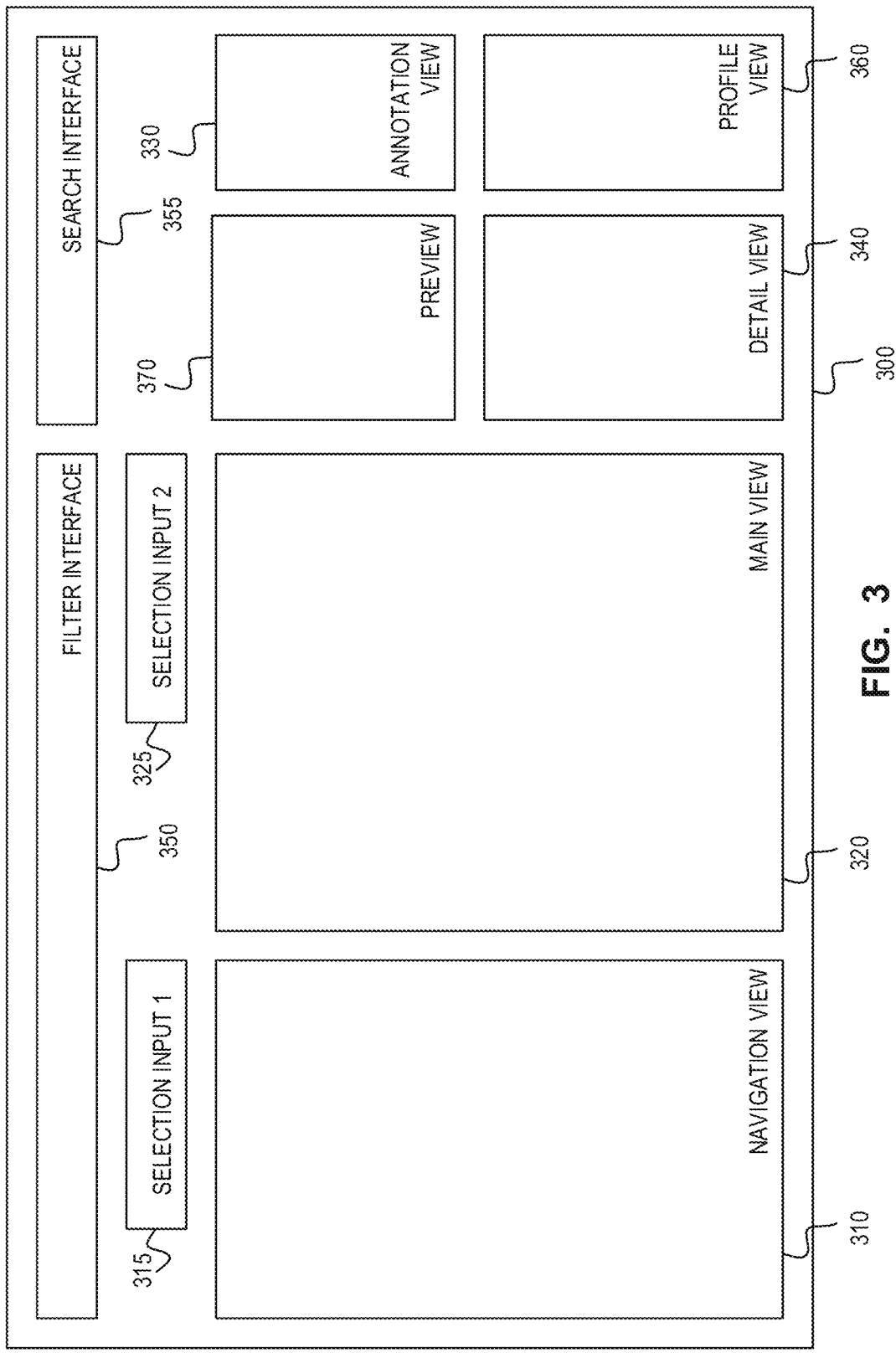
FIG. 3 is a graphical user interface of a forensic data investigation application in accordance with an example embodiment.

Referring now to FIG. 3, there is shown a graphical user interface 300 of an example forensic data investigation application, which can be used to view a data collection once generated by the forensic data investigation tool.

Graphical user interface 300 may be generated by a computing device, such as computing device 110 or computing device 210, and displayed on a display such as output device 250 of computing device 210.

In particular, graphical user interface 300 may be generated and displayed to allow a user of the computing device to review and examine data items within a data collection, as generated by a forensic data investigation software application.

In the example embodiment, graphical user interface 300 has a navigation view area 310, a selection input 315, a main view area 320, a selection input 325, an annotation view area 330, a detail view area 340, a filter interface 350 and a search interface 355. Each of the areas or elements of graphical user interface 300 (e.g., navigation view 310, main view 320, annotation view 330, detail view 340 and preview 370) may be repositioned, resized, detached and displayed in a separate window or hidden from view, while remaining synchronized with the other elements. In some cases, additional elements may be displayed. In still other embodiments, various elements may be combined. For example, a preview may be displayed within a detail view 340.

Navigation view 310 may be used to display organizational data relating to data items. For example, while in an artifact view display type, navigation view 310 may be formatted to display one or more categories or subcategories of data artifacts, or both. A user of the computing device may select such categories or subcategories, to cause the computing device to search within a current data collection and generate a display of data artifacts within the selected categories or subcategories in a main view 320. Selection of a category or subcategory in navigation view 310 can be used as a type of implicit filter, in addition to explicit or contextual filters as described elsewhere herein.

Selection input 315 may be used to change the display type of navigation view 310. For example, selection input 315 may be a button or group of buttons or a drop-down dialog box, which allows the user to select one of a plurality of display types. One display type is the artifact view display type. However, examples of other display types are a filesystem display type, a database display type, a registry view display type, and generic display types.

In general, operation of the selection input 315 serves to change the display type of navigation view 310. In some cases, this change in display type may cause the presentation format of main view 320 to be changed accordingly. In such cases, computing device may attempt to retain the previously selected data items within main view 320 to the extent possible.

In a filesystem display type, navigation view 310 may be formatted to display a filesystem hierarchy corresponding to that of the target device or target devices used to generate the current data collection. For example, if a target device is a laptop computer, the displayed filesystem hierarchy may correspond to that of the target laptop computer's mass storage device (e.g., solid state disk). The navigation view 310 may allow the user to navigate within the filesystem hierarchy and select directories, the contents of which (i.e., data items originally found in the selected directory) can be displayed in main view 320. The navigation view 310 may allow for filesystem hierarchies to be expanded and collapsed, for example, by use of a disclosure triangle control.

In some cases, the filesystem display type may also display data items relating to filesystem components such as disk partitions, unallocated space, logical volumes, deleted files, and other objects associated with a filesystem.

In a registry view display type, navigation view 310 may be formatted to display a system registry hierarchy, such as the MICROSOFT WINDOWS™ registry. For other operating systems, the registry view display type may be adapted to display system configuration files and information. For example, for the MAC OS X™ operating system, the registry view display type may display XML files and key-value data corresponding to system configuration settings. The navigation view 310 may allow the user to select certain registry parameters, and data items associated with the selected registry parameters can be displayed in main view 320. For example, the navigation view may display a registry tree, the registry tree having selectable registry tree elements that can be used to filter the displayed data items in main view 320 according to a selected registry tree element.

In a database display type, navigation view 310 may be formatted in similar fashion to filesystem display type, to display a filesystem hierarchy containing a database file or files, such as the file containing a SQL database. The navigation view 310 may allow the user to identify a database to examine, and data items associated with the selected database can be displayed in main view 320 in a database presentation format.

Main view 320 generally is used for the display of data items. Data items may be displayed in one or more presentation formats. Examples of presentation formats include, but are not limited to, column detail, row detail, chat thread, thumbnail, timeline, map, filesystem and registry. A selection input 325, such as a drop-down dialog, can be used to change between presentation formats.

In general, operation of the selection input 325 serves to change the presentation format of main view 320. Computing device may attempt to retain the previously selected data items within main view 320 to the extent possible for the presentation format.

Many of the described presentation formats allow for the display of data items in a heterogeneous list, that is, displaying more than one type of data item contemporaneously in main view 320. For example, a main view 320 in a row detail presentation format may display data artifacts of the media category, data artifacts of the chat category, data artifacts of the web browser category, data items of the file type, and still others in a single list. Other presentation formats can also display data items of multiple categories. For example, a column detail presentation format can similarly display data items of multiple categories in main view 320, in some cases displaying additional columns for attributes specific to each type of displayed data item.

When a particular data item is selected in main view 320, attributes of the data item also can be displayed in detail view 340 in a detailed summary format. Detail view 340 may be scrollable or resizable, or both, to allow a user to view all attributes relating to the selected data item. In some cases, detail view may also include a preview of the data item. In other cases, the preview may have a separate view.

Generally, detail view 340 can provide a summary of the attributes for a selected data item, where those attributes may also be displayed in columns of a column detail presentation format.

In some cases, multiple data item may be selected in main view 320, in which case detail view 340 may display aggregate information relating to, or common to, all selected data items.

A preview area 370 may also be provided in some cases. As the name implies, the preview area may display a preview of a selected data item. For example, for a media data artifact, preview area 370 may display a resized image or an image thumbnail of a video. In another example, for a document data artifact, preview area 370 may display a rendering of the document contents. In some cases, where the selected item is not a data artifact, preview area 470 may contain a text view which displays text strings extracted from the selected data item, or a hex view, which displays data in raw hexadecimal format for the selected data item. Various other types of previews for different types of data artifacts may also be displayed using a suitable renderer.

Annotation view 330 can be used to allow a user to tag data items with labels or annotations. Tags can be applied to any type of data item described herein, whether or not they are also data artifacts (e.g., files, folders, chat artifacts, etc.). Annotation view 330 may include predefined tags or labels, which can be selected in the graphical user interface 300. In some cases, annotation view 330 may allow the user to define additional tags or labels, comments and profiles, which can be applied to selected data items. Once defined, tags or labels, comments and profiles can be used as search or filter criteria.

Profile view 360 can be used to allow a user to assign a profile identifier to a data item. The profile identifier may be generated by the computing device when a new profile is created, and may optionally be given a friendly name by the computing device or the user. Generally, when the user assigns a profile identifier to a data item, computing device can parse the data item—which may be a data artifact—to determine whether the data item contains a unique user identifier, such as an e-mail address, chat service username, phone number, address or the like. The computing device may then analyze other data items within the data collection to identify instances of the unique user identifier, and assign the same profile identifier to those data items. The profile identifier can then be used to filter data items, for example using filter interface 350, allowing the user to quickly and easily identify data items that relate to a particular profile, which may itself relate to a particular person of interest. In some embodiments, profile identifiers may only be assigned to data artifacts.

Filter interface 350 can be used to filter the data items displayed in main view 320 or also navigation view 310. In general, filter interface 350 can be used to filter on any attribute of a data item, including but not limited to, type or category, dates and times, and tags. Filters can also be combined, for example by applying multiple filters successively. In some cases, Boolean operators, such as AND, OR or NOT may be applied to combine filters. In some embodiments, filter interface 350 may allow for pattern matching, e.g., with regular expressions, to be used to define filters.

When a filter is selected or applied, an active filter indication may be provided, to indicate that the filter is in effect and thereby limiting the data items displayed. In some cases, the active filter indication is a shading of the filter dialog, for example with a color. The active filter indication can be removed when all filters are deselected.

Similarly, search interface 355 can be used to enter freeform text and search for specific attributes, such as names, types, dates, and the like. An advanced search interface can also be provided, to allow a user to craft specific searches.

Figure 4:
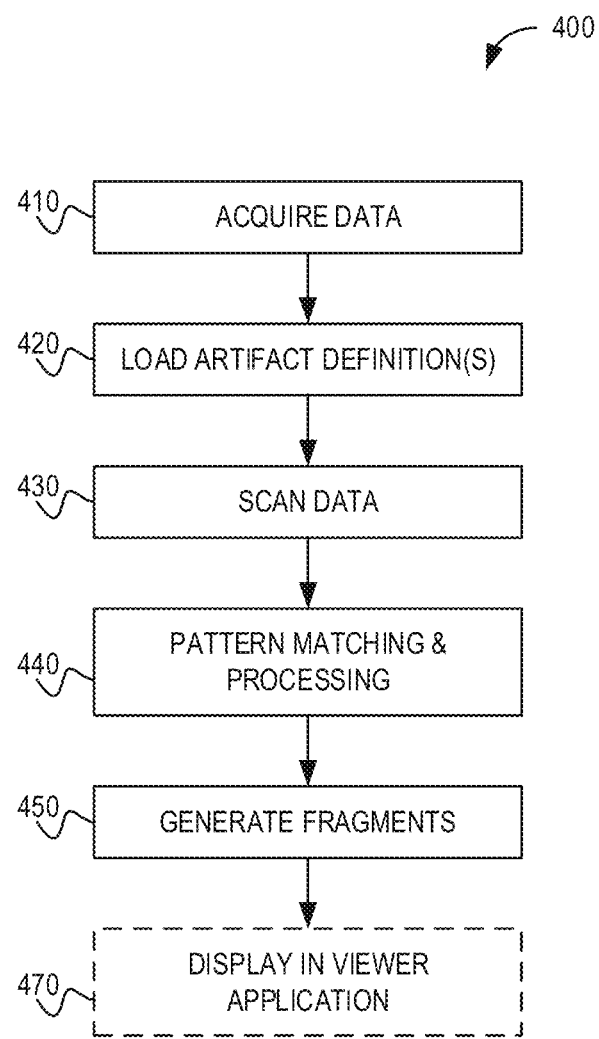
FIG. 4 is an example refining process flow in accordance with some example embodiments.

Referring now to FIG. 4, there is shown a retrieval or refining process flow 400 in accordance with some example embodiments. Method 400 may be carried out, for example using computing device 110 executing a forensic data retrieval and investigation tool provided to the computing device and stored thereon.

Method 400 begins with acquisition of data from a target device at 410. Data may be acquired, for example, by a low-level block-based copy from a target device storage media, to retrieve all data on the device, regardless of whether attempts have been made to delete the data. In other cases, data may be acquired by copying files and folders using operating system-level file copy facilities. Other data retrieval techniques may also be used, as will be known.

At 420, the computing device 110 may load at least one artifact definition from a memory where the artifact definition is pre-stored. Each artifact definition may define one or more artifact type to be scanned for in the data acquired from the target device. Artifact definitions can be stored in the memory in the form of a structured data definition, such as an extensible markup language (XML) file, a Javascript Object Notation (JSON) file, or other suitable format or file. In particular, artifact definitions can be provided in the form of user-editable files, which can be created and loaded without the need to alter or re-compile the forensic data investigation software.

Optionally, the forensic data investigation software may provide an interface for allowing the user to load or specify one or more artifact definition files. In some cases, artifact definitions may be provided or edited by way of a graphical user interface within the forensic data investigation software and stored in a structured data format, or using a proprietary data representation.

Each artifact definition may have a preamble or tag to define metadata regarding the artifact to be generated, such as a type, a name, a version and the like. An example artifact definition preamble may be specified as follows:

<Artifact type="Fragment" name="URL" version="1.0">

Generally there may be at least two primary types of artifact definitions: database-type artifact definitions and fragment-type artifact definitions. Each artifact definition defines at least one pattern to be matched in the acquired data to identify candidate artifacts. Database-type artifact definitions may be created to search within existing databases and, as such, may contain primarily parsing patterns as described herein. In contrast, fragment-type artifact definitions may be created to search any type of data, whether structured or unstructured and, as such, generally contain carving patterns as described herein. Both types of artifact definition can contain a source definition.

A source definition can be specified in the artifact definition as a pattern to be matched in identifying a possible source of data. In some cases, the source definition can be a filename (e.g., outlook.pst) or partial filename (e.g., .docx). In some cases, the source definition can include, or be, a regular expression. One example source definition may be:

<Source type="Filename">user.dat</Source>

Another source definition may be:

<Source type="Regex">[0-9]{4}-[A-Za-z0-9]{5}-[A-Za-z0-9]{4}.sqlite</Source>

Source definitions can be useful for narrowing the search for data of interest. For example, a source definition as above may be used to identify only those files that are likely to contain data of interest, such as registry databases, e-mail databases, and other files or databases, thereby lowering the processing burden and false positives that may result from a broader search. Accordingly, artifact definitions may contain at least one source definition, to aid in the refining process. In some embodiments, only one source definition is permitted. However, in some other embodiments, multiple source definitions may be permitted, which can be combined using logical operands (e.g., AND, OR). Some artifact definitions, such as a fragment-type artifact definition, may omit a source definition altogether.

Another type of pattern which may be used in an artifact definition is a parsing pattern. Parsing patterns are those that rely on existing filesystem or database structures, or operational application programming interfaces in order to extract data. For example, one type of parsing pattern is an SQL query. As such, parsing patterns are generally used in database-type artifact definitions, and usually in conjunction with at least one source definition.

When searching for data within a database, a database-type artifact definition can contain at least one parsing definition. One type of parsing definition may specify a database table name definition with a table name to be searched for the data, as follows:

<Table name="Users"/>

As an alternative to the table name definition, the parsing definition may include a database query definition, containing for example a SQL query, to be used within the database to retrieve the data subset of interest. For example, when searching for a particular subset of data in a database, one example parsing definition may be:

```
<Query>SELECT Album.[Cover] as Cover, Album.[Title] as
    Title, Artist.[Name] as Artist
FROM Album
INNER JOIN Artist
ON Album.[ArtistId] = Artist.[ArtistId]
WHERE Album.[Cover] IS NOT null</Query>
```

A database query can be constructed using a programmatic or query language. In some cases, the computing device may provide a graphical user interface to assist in generating a query.

As noted above, another type of pattern to be matched is a carving definition. Data carving is the process of extracting some data from a larger data set. As compared with parsing, data carving does not rely on existing file or database structures, or application programming interfaces. For example, data carving may be used during a digital investigation when corrupted files or unallocated file system space is analyzed to extract data. Generally, data can be "carved" from source data using specific header and footer values. As such, carving patterns are generally used in fragment-type artifact definitions.

When searching for a fragment-type artifact, an artifact definition contains a carving definition to identify a data subset in the acquired data. A carving definition generally contains one or more sub-definitions, used to specify more detailed characteristics of the data subset that is to be retrieved in order to generate a desired artifact.

When working with other types of data (e.g., other than data that can be parsed using a parsing definition), a carving definition can include a data pattern referred to as a "header" that can indicate the presence of a particular data subset of interest. In some embodiments, the header data pattern may be a requirement for a fragment-type artifact definition. The header data pattern may be an array or sequence of bytes, or multiple arrays of bytes, that are indicative of a desired file type. The header data pattern may also be in the form of a regular expression. Some header data patterns may be:

```
<Header value="0x11, 0x19, 0x1B, 0x2F, 0x2F" type="Hex"/>
<Header value="example" type="Text" offset="-16" />
<Header value="[0-9]{4}-[A-Za-z0-9]{5}" type="Regex"/>
```

In some cases, the header data pattern may specify data that is embedded within a file of interest, not necessarily at the start of a file. Therefore, the header data pattern may further include a byte offset that can be used to indicate a number of bytes to traverse forward or backward when generating a desired artifact. For example, the header data pattern may identify a pattern of bytes that always occurs 30 bytes after the start of a desired file type, therefore, the byte offset can indicate to the computing device that it should construct the artifact by retrieving data beginning at 30 bytes prior to the location of the header data pattern. Likewise, the byte offset can be used to retrieve only data that comes after the header data pattern occurs in the data.

In some cases, the carving definition may include a footer data pattern. Similar to the header data pattern, the footer data pattern can be a byte array or arrays, or a regular expression that indicates the end of an artifact of interest:

```
<Footer value="0x10,0x20,0x30,0x40" type="Hex"/>
<Footer value="end phrase" type="Text"/>
<Footer value="{zzz|ZZZ}" type="Regex"/>
```

In some cases, the carving definition may include a length definition, either in lieu of, or in addition to, the footer data pattern. In at least one embodiment, a length definition is required when a parsing definition is not present in the artifact definition. The length definition can include a minimum length of the artifact. Particularly in cases where a footer data pattern is not provided, the minimum length can be used to generate an artifact of a desired size. The length definition can also include a maximum length of the artifact, for example, to prevent generating artifacts over a predetermined size. An example length definition may be:

```
<Length
    minimum="8"
    maximum="1048576"
    offset="32"
    endianness="Little"
    type=uint32 />
```

The length definition may also include an indication of the data endianness and a data type. Data type may indicate, for example, a string or numerical format (e.g., int32, uint16, sbyte, etc.).

In some embodiments, the length definition can provide for dynamic length definition. To determine the length of an artifact with dynamic length, typically the offset, endianness and type attributes should be provided. Based on the offset, endianness and type attributes, the computing device can compute a dynamic length of the payload for each artifact that is generated.

In some embodiments, each artifact definition may contain more than one source, parsing or carving definition, which can be combined using logical operators. In some embodiments, the logical operators can be specified in the artifact definition. In some cases, the source, parsing or carving definitions may be cumulative, such that all definitions must be matched to generate one artifact. However, in some other cases, the source, parsing or carving definitions may be additive, such that each successive definition is used to identify discrete elements of a particular artifact. For example, for a web browser history artifact, one carving definition may be used to locate a URL in the web browser history, while another parsing or carving definition may be used to locate cached images; the resulting artifact can combine both data subsets into a single artifact.

Artifacts, once generated, are generally stored in a forensic database. Therefore, to provide a common structure for artifacts, the data subset retrieved according to the parsing or carving definition may be mapped to an artifact database using a mapping definition.

For example, for an artifact whose source is database data, the mapping definition can include a source database column name (i.e., column in which the source data was retrieved), a forensic database column name (i.e., that will contain the fragment record of the artifact). The mapping definition can also include a data type, such as integer, floating point number, text string, date/time, binary long object (BLOB) or the like. For example, the mapping definition may be as follows for a music catalog artifact generated using the example SQL query described above:

```
<Fragments>
    <Fragment
        source="Cover"
        alias="Album Cover"
        datatype="Attachment"
        category="None"/>
    <Fragment
        source="Title"
        alias="Album Title"
```

-continued

```
        datatype="String"
        category="None"/>
    <Fragment
        source="Artist"
        alias="Artist Name"
        datatype="String"
        category="None"/>
</Fragments>
```

In some embodiments, the mapping definition may also include one or more category, for categorization of the artifact by a forensic data viewer application as described with reference to FIG. 3.

For an artifact that originates from generic data, the mapping definition similarly may include a forensic database (i.e., output database) column name, a data type and a category. In some embodiments, more than one category may be specified. One example mapping definition for a URL-type artifact may be:

```
<Fragments>
    <Fragment source="Fragment" datatype="String"
        category="Url" />
</Fragments>
```

In some cases, an artifact definition may contain multiple mapping definitions, e.g., for mapping data from a database source to a single artifact.

Once the artifact definition is loaded and parsed at 420, the computing device may scan data acquired from the target device 430. The computing device may scan for multiple artifacts in one pass, or the computing device may scan for particular artifacts after the data has been acquired. In some alternative embodiments, the acquired data can be scanned on demand as artifact definitions are created or loaded.

At 440, data subsets that match patterns defined in artifact definitions can be extracted from the acquired data. In some cases, extraction may involve simply identifying the memory location or locations of the data subset in the acquired data, rather than copying of the data subset to a separate memory location.

At 450, artifacts are generated and stored in the forensic database as fragment records, using the associated mapping definitions. The resulting artifacts can be viewed using a suitable viewer application at 470.

Based on the described embodiments, a wide variety of artifact definitions can be created by the user. Some specific examples are provided herein to aid understanding.

In one example, a database-type artifact definition can be created to search within multiple databases with filenames that match a regular expression and containing a table named "Customer", to extract name and address information. Such a database-type artifact definition may be specified as follows:

```
<?xml version="1.0" encoding="UTF-8"?>
<Artifacts
    version="1.0">
    <Artifact
        type="SqliteArtifact"
        name="Chinook Customer Table"
        version="1.0">
        <Source type="Regex">[0-9]{4}-[A-Za-z0-9]{5}-[A-Za-z0-9]{4}.sqlite</Source>
        <Table name="Customer" />
        <Fragments>
            <Fragment
                source="FirstName"
                alias="First Name"
                datatype="String"
                category="None"/>
            <Fragment
                source="LastName"
                alias="Last Name"
                datatype="String"
                category="None"/>
            <Fragment
                source="Company"
                alias="Company Name"
                datatype="String"
                category="None"/>
            <Fragment
                source="Address"
                alias="Street Address"
                datatype="String"
                category="None"/>
            <Fragment
                source="City"
                alias="City"
                datatype="String"
                category="None"/>
            <Fragment
                source="Country"
                alias="Country"
                datatype="String"
                category="None"/>
            <Fragment
                source="Email"
                alias="Customer Email Address"
                datatype="String"
                category="PersonIdentifier"/>
        </Fragments>
    </Artifact>
</Artifacts>
```

In another example, a database-type artifact definition can be created to search within a database using a SQL query to extract media information. Notably, the query may contain information used to aid mapping, by using the SQL "as" keyword to define an SQL alias for each data value (e.g., Album.[Cover] as Cover). Such a database-type artifact definition may be specified as follows:

```
<?xml version="1.0" encoding="UTF-8"?>
<Artifacts
    version="1.0">
    <Artifact
        type="SqliteArtifact"
        name="Chinook Album Query with attachments"
        version="1.0">
        <Source type="FileName">Chinook_Sqlite.sqlite</Source>
        <Query>SELECT Album.[Cover] as Cover, Album.[Title] as
            Title, Artist.[Name] as Artist
            FROM Album
            INNER JOIN Artist
            ON Album.[ArtistId] = Artist.[ArtistId]
            WHERE Album.[Cover] IS NOT null</Query>
```

```
        <Fragments>
            <Fragment
                source="Cover"
                alias="Album Cover"
                datatype="Attachment"
                category="None"/>
            <Fragment
                source="Title"
                alias="Album Title"
                datatype="String"
                category="None"/>
            <Fragment
                source="Artist"
                alias="Artist Name"
                datatype="String"
                category="None"/>
        </Fragments>
    </Artifact>
</Artifacts>
```

In another example, a fragment-type artifact definition can be created to search within a SQLite database of business contacts to identify the names and job titles of known contacts. Although the source data is a database file, the file may be corrupted or altered, rendering it difficult or impossible to use database facilities to retrieve data. In such case, the SQLite database nevertheless may contain specific byte patterns that characterize the start (header) and end (footer) of a record. Therefore, a fragment-type artifact definition may be specified to carve data as follows:

```
<?xml version="1.0" encoding="UTF-8"?>
<Artifacts
    version="1.0">
    <Artifact
        type="FragmentedArtifact"
        name="Contacts Name + Job Title Finder"
        version="1.0">
        <Source type="FileName">Contacts_sqlite.sqlite</Source>
        <Headers>
            <Header value="0x11, 0x19, 0x1B, 0x2F, 0x2F"
                type="Hex"/>
        </Headers>
        <Footers>
            <Footer value="0x30, 0x30, 0x3A, 0x30, 0x30, 0x3A,
                0x30" type="Hex"/>
        </Footers>
        <Length maximum="64" minimum="8"/>
        <Fragments>
            <Fragment
                source="Fragment"
                datatype="String"
                category="None"/>
        </Fragments>
    </Artifact>
</Artifacts>
```

In another example, a fragment-type artifact definition can be created to search across all acquired data, to match any URL. Such a fragment-type artifact definition may be specified as follows:

```
<?xml version="1.0" encoding="UTF-8"?>
<Artifacts
    version="1.0">
    <Artifact
        type="FragmentedArtifact"
        name="HTML Link Finder"
        version="1.0">
        <Headers>
            <Header value="<a href=" type="Text"/>
        </Headers>
        <Footers>
            <Footer value=">" type="Text"/>
        </Footers>
        <Length maximum="1024" minimum="2"/>
        <Fragments>
            <Fragment
                source="Fragment"
                datatype="String"
                category="Url" />
        </Fragments>
    </Artifact>
</Artifacts>
```

Figure 5:
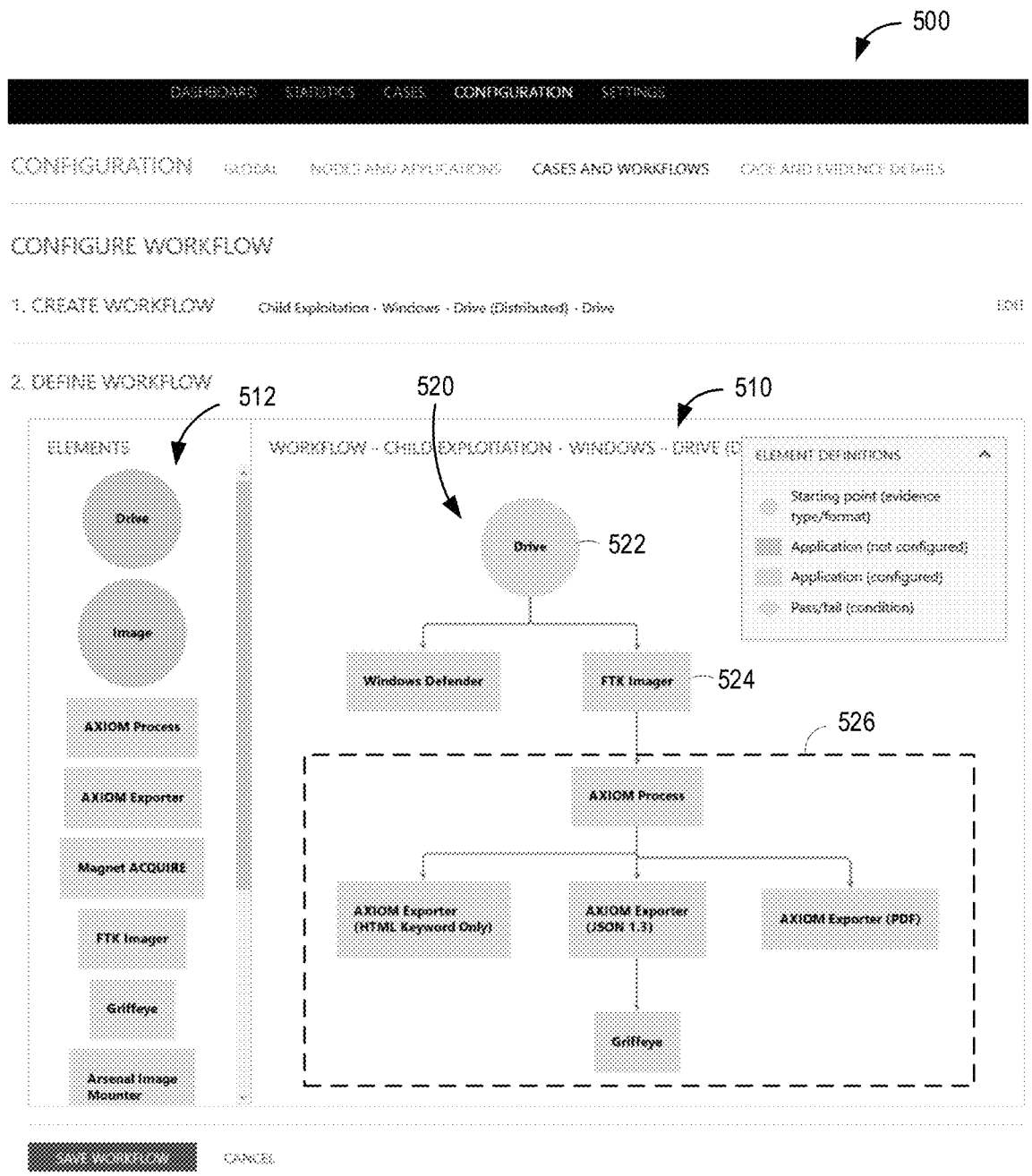
FIG. 5 is a graphical user interface for a forensic data investigation application in accordance with another example embodiment.

Referring now to FIG. 5, which is a graphical user interface 500 of an example forensic data investigation application. Graphical user interface 500 can be used to define an investigation workflow for the forensic data investigation application. As shown in FIG. 5, the graphical user interface 500 includes an example workflow definition area 510 in which workflow elements 512 can be organized into an investigation workflow, such as 520, to be conducted by the forensic data investigation application.

The example investigation workflow 520 shown in FIG. 5 is for targeting forensic data associated with child exploitation material. It will be understood that the same investigation workflow 520 could be applied to different types of digital forensic investigations, or other investigation workflows could be generated for targeting child exploitation investigations. The investigation workflow 520 could be varied to adapt to various aspects of the digital forensic investigations, such as, but not limited to, the type and/or amount of forensic data being investigated, the urgency of the investigation, the geography from which the forensic data was obtained, etc.

Figure 9:
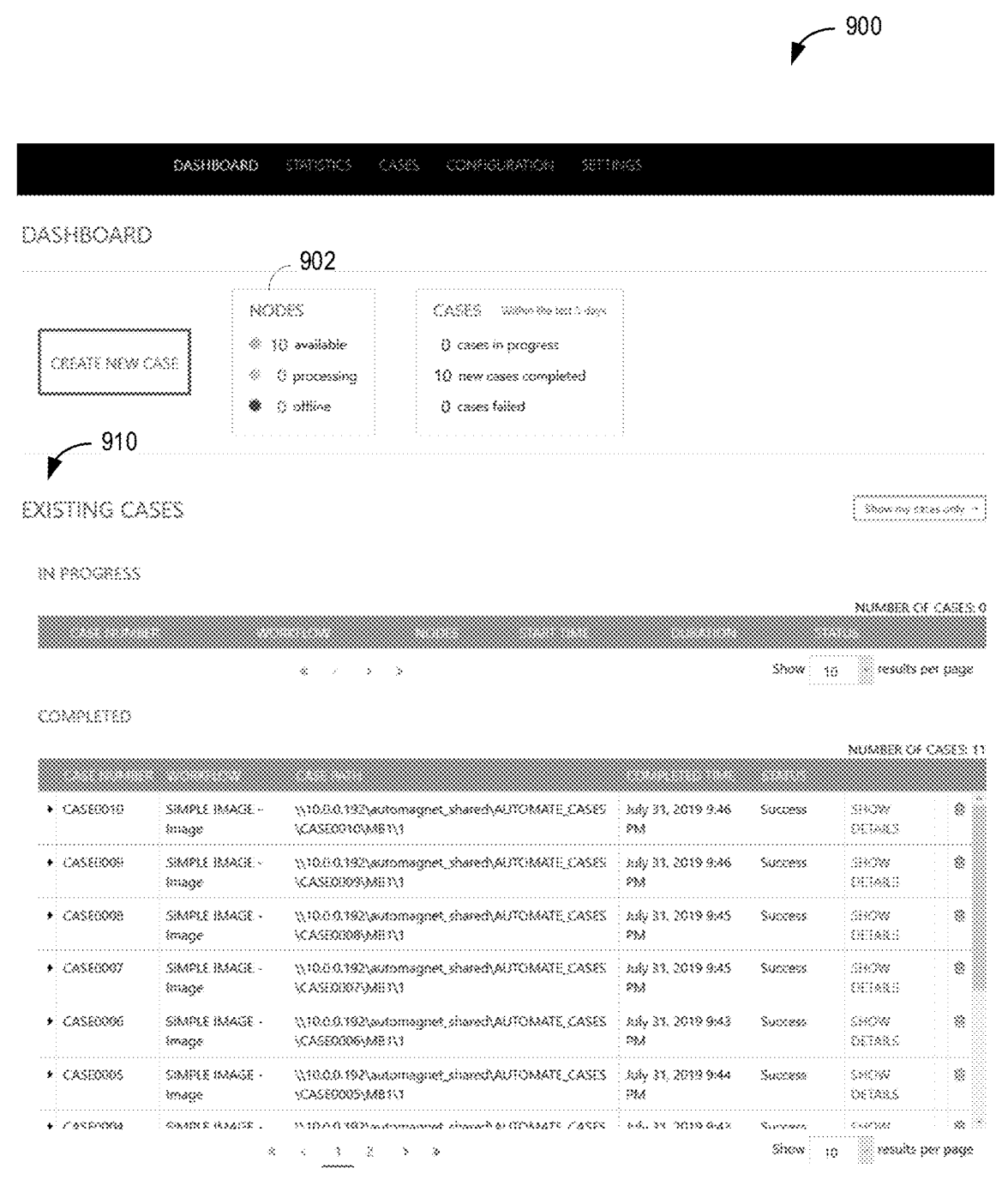

The example investigation workflow 520 is applied to an identified drive 522. The identified drive may be physically present at the device configuring the example investigation workflow 520, or may be provided remotely, e.g., via a virtual private network as further described herein. At 524, the forensic data investigation application is triggered to generate a disk image of the drive identified at 522. Following the generation of the disk image, the forensic data investigation application is triggered by the investigation workflow 520 to apply a digital forensic analysis routine 526. An example digital forensic analysis routine 526 is illustrated in FIG. 5 but it will be understood that other digital forensic analysis routines 526 can be applied depending on various factors of the investigation, as explained. The digital forensic analysis routines 526 may be carried out locally at the device configuring the example investigation workflow 520, or may be carried out by remote computing devices accessible via a gateway or virtual private network as further described herein. Each of the remote computing devices may be provided access to the disk image of the identified drive 522—or data stemming from the disk image—via the gateway or virtual private network, for example. FIG. 9 shows an example graphical user interface 900 displaying an existing case list 910 (or forensic investigation list), and node list 902 (or agent computing device list).

Figure 6:
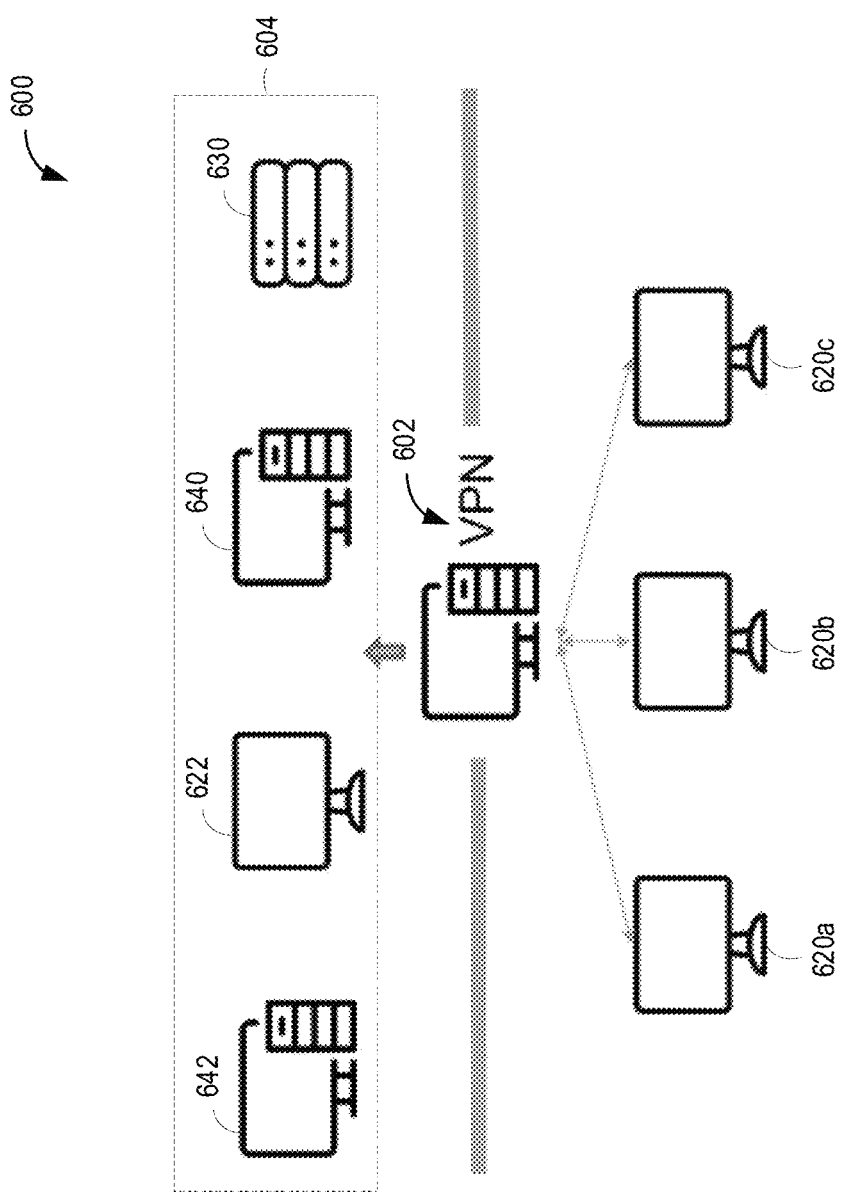
FIG. 6 is a block diagram of a digital forensic data investigation system in accordance with another example embodiment.

Referring now to FIG. 6, there is shown a block diagram of another example embodiment of the digital forensic data investigation system 600.

The digital forensic data investigation system 600, as shown herein, includes a virtual private network 602 via which a central computing device 640 can communicate with remote computing devices 620 and also a data communication network 604 via which the central computing device 640 can communicate with networked devices, as will be described. The digital forensic data investigation system 600 includes remote computing devices 620a, 620b, 620c that communicate with virtual and/or physical computing devices via a virtual private network 602. The virtual and/or physical computing devices can include virtual computing devices accessible via network servers and/or physical computing devices located on site (e.g., at the forensic lab), such as 622, 640, 642, and data storage device 630. The virtual computing devices can be implemented by running a virtual machine on an operating system, such as WINDOWS™. The data storage devices 630 can include any storage devices, such as a hard drive, USB key, magnetic and solid state disk drives, optical media, and/or network file shares. In at least some embodiments, data storage devices 630 may be a distributed cloud-based storage system, such as AMAZON S3™.

In some embodiments, virtual private network 602 may be omitted and a gateway may be substituted in its place. Likewise, a public network—such as the Internet—may be used instead of virtual private network 602 and the endpoints may use alternative methods to secure their communications (e.g., end-to-end encryption).

Figure 10:
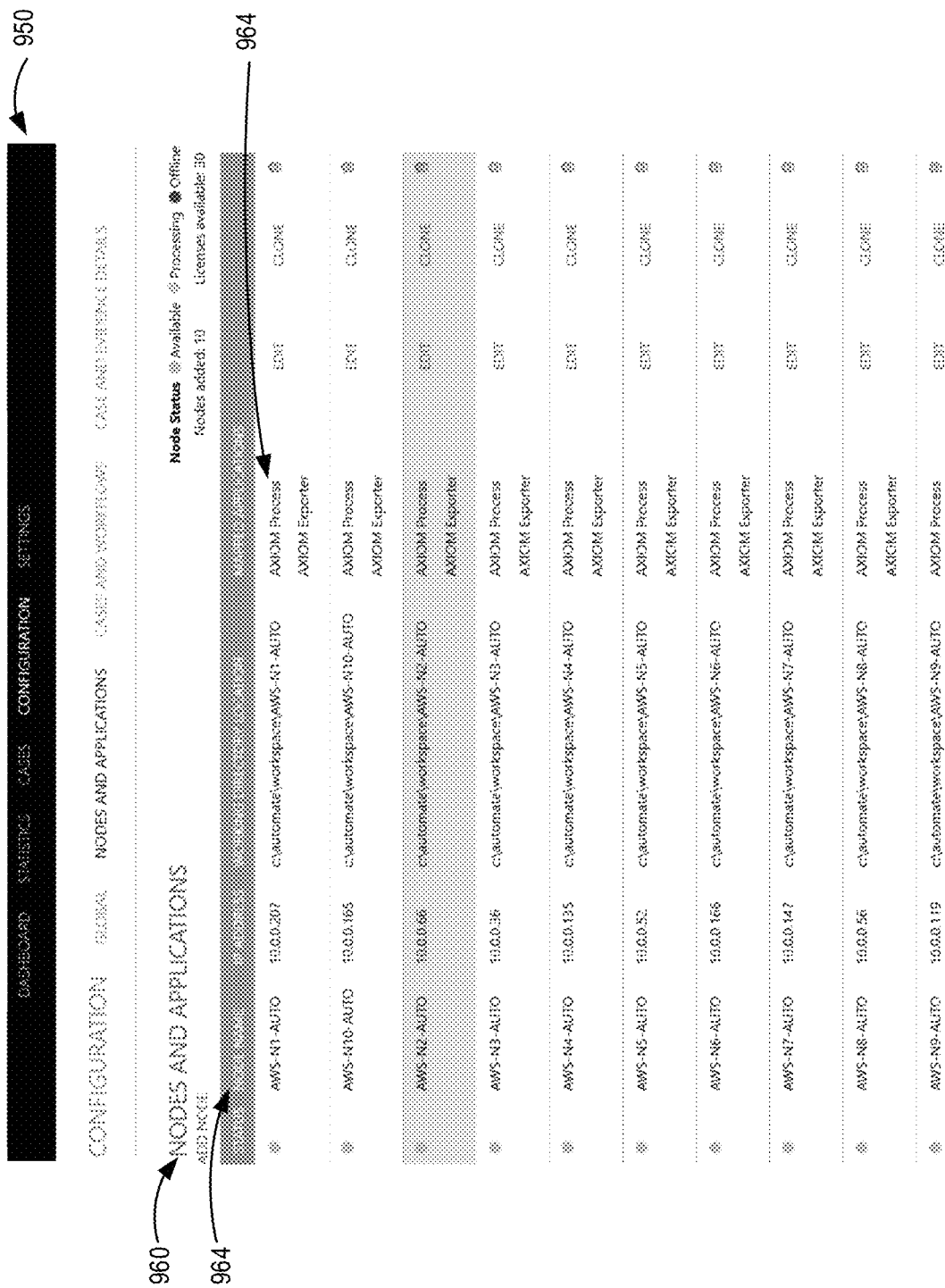
FIG. 10 is a graphical user interface for a forensic data investigation application in accordance with another example embodiment.

Computing devices 622, 640, 642 and data storage device 630 can be networked to communicate with each other over the data communication network 604, for example. The data communication network 604 can include a private and/or public data communication network. In the example digital forensic data investigation system 600, computing device 642 can be used for verifying credentials required for accessing the data storage device 630, computing devices 620a, 620b, 620c, 622. The computing device 622 can be a node instantiated on a cloud-based computing platform, such as, but not limited to, AMAZON WEB SERVICES™. FIG. 10 shows an example graphical user interface 950 displaying a detailed node view 960 of the node list 902 (or agent computing device list). As can be seen in FIG. 10, the detailed node view 960 includes node identifiers 962 corresponding to each agent computing device, as well as applications 964 stored thereupon.

In the example shown in FIG. 6, computing device 640 can act as a central computing device that manages the operation of the digital forensic data investigation system 600, including the operation of the agent computing devices 622, 620a, 620b, 620c. The computing device 640 may itself be a node instantiated on a cloud-based computing platform, which may be accessible remotely via a suitable device, such as computing devices 620a to 620c. In some cases, a software application (e.g., client software) may be provided to a remote computing device to enable a user of the remote device to access the functionality of the central computing device 640.

The central computing device 640 can provide the graphical user interfaces 300, 500, 900, 950, 1000, 1050 with which the digital forensic data investigation system 600 can receive user inputs. In some embodiments, the central computing device 640 can include a virtual computing device.

The agent computing devices 622, 620a, 620b, 620c can be assigned different role(s) by the central computing device 640. Depending on the assigned role, the appropriate software application can be installed on the respective agent computing device 622, 620a, 620b, 620c. The different role(s) that can be assigned to the respective agent computing device 622, 620a, 620b, 620c can include data collection, disk imaging, data processing (e.g., encryption detection, evidence recovering, image categorization, etc.). It is possible for an agent computing device 622, 620a, 620b, 620c to be assigned multiple roles and therefore have multiple software applications installed thereon. In some embodiments, the agent computing device 622, 620a, 620b, 620c can be assigned a role that is part of the digital forensic analysis routine 526 (see FIG. 5) and be installed with the respective forensic analysis tools. For example, the central computing device 640 can operate to assign the agent computing devices 622, 620a, 620b, 620c to different stages of the investigation workflow 520. Depending on the stage of the workflow and/or available resources, the central computing device 640 can trigger the various stages of the investigation workflow 520 to take place in a distributed or localized manner.

For example, remote computing devices 620a can be a kiosk device located at a port of entry for obtaining disk images of hard drives being investigated. The remote computing device 620a can obtain the disk image(s) and make the disk image(s) available for forensic analysis via the virtual private network 602.

In another example, remote computing device 620b can be a target computing device in an investigation, such as a personal computer that is the subject of a criminal investigation. The central computing device 640 can remotely deploy a remote data acquisition software application that is installed on the remote computing device 620b, whereupon the central computing device 640 can send commands to the remote data acquisition software application to acquire data from the remote computing device 620c and transmit the acquired data to central computing device 640, storage 630 and/or any other device, such as a processing node 622 or even a different remote computing device.

To install the remote data acquisition software application, an administrative password of the remote computing device 620b may be provided (e.g., locally or via netadmin facilities) to the remote computing device 620b; however, following installation of the remote data acquisition software application, the central computing device 640 can direct all further data acquisition actions without need of the administrator password. In some cases, following installation of the remote data acquisition software application, the remote computing device 620b may appear to be, or may be, on the same network or virtual private network as the central computing device 640.

In some cases, the remote data acquisition software application may be installed by retrieving an installation script from a web server, which then downloads the remote data acquisition software installer and any ancillary software, such as virtual private networking software. For example, virtual private networking software may be installed if the remote computing device 620b is behind a firewall or gateway that does not permit external devices to directly connect to the remote computing device 620b (in such cases, the virtual private network can establish a tunnel for accessing the remote computing device 620b). The installation script may also register the remote computing device 620b for access to the virtual private network 602, if it is being used.

In some cases, the central computing device 640 can direct the remote computing device 620b to uninstall and remove the remote data acquisition software (and ancillary software) following acquisition.

In another example, remote computing device 620c can be a mobile device or a bootable Flash drive operable by an onsite investigator for obtaining forensic data from devices located at crime scenes, for example. The remote computing device 620c can obtain the relevant forensic data and make the data (or an image thereof) available for forensic analysis via the virtual private network 602. For example, the collected disk images can be stored at a networked storage component accessible via the virtual private network 602 and/or the data communication network 150, such as the data storage device 630.

In some embodiments, the remote computing devices 620a, 620b, 620c can operate to initially filter the collected forensic data and prioritize transmission of higher priority data over lower priority data. For example, the central computing device 640 can configure the remote data acquisition software to filter data prior to transmission according to name, extension, size, date, application type, regular expression matches, directory, and the like. For example, to account for bandwidth constraints, the remote data acquisition software may filter out files with sizes that exceed one or more predetermined size threshold. The remote data acquisition software may instead provide metadata (e.g., metadata relating to the file from the master file table).

In some embodiments, the central computing device 640 can dynamically allocate the agent computing devices 622, 620a, 620b, 620c. For example, the central computing device 640 can receive a notification indicating a forensic investigation has an urgent status and needs to be prioritized. The central computing device 640 can then reallocate the agent computing devices 622, 620a, 620b, 620c to accommodate the analysis required for the urgent forensic investigation. The central computing device 640 can be allocated more agent computing devices, as needed.

Figure 11:
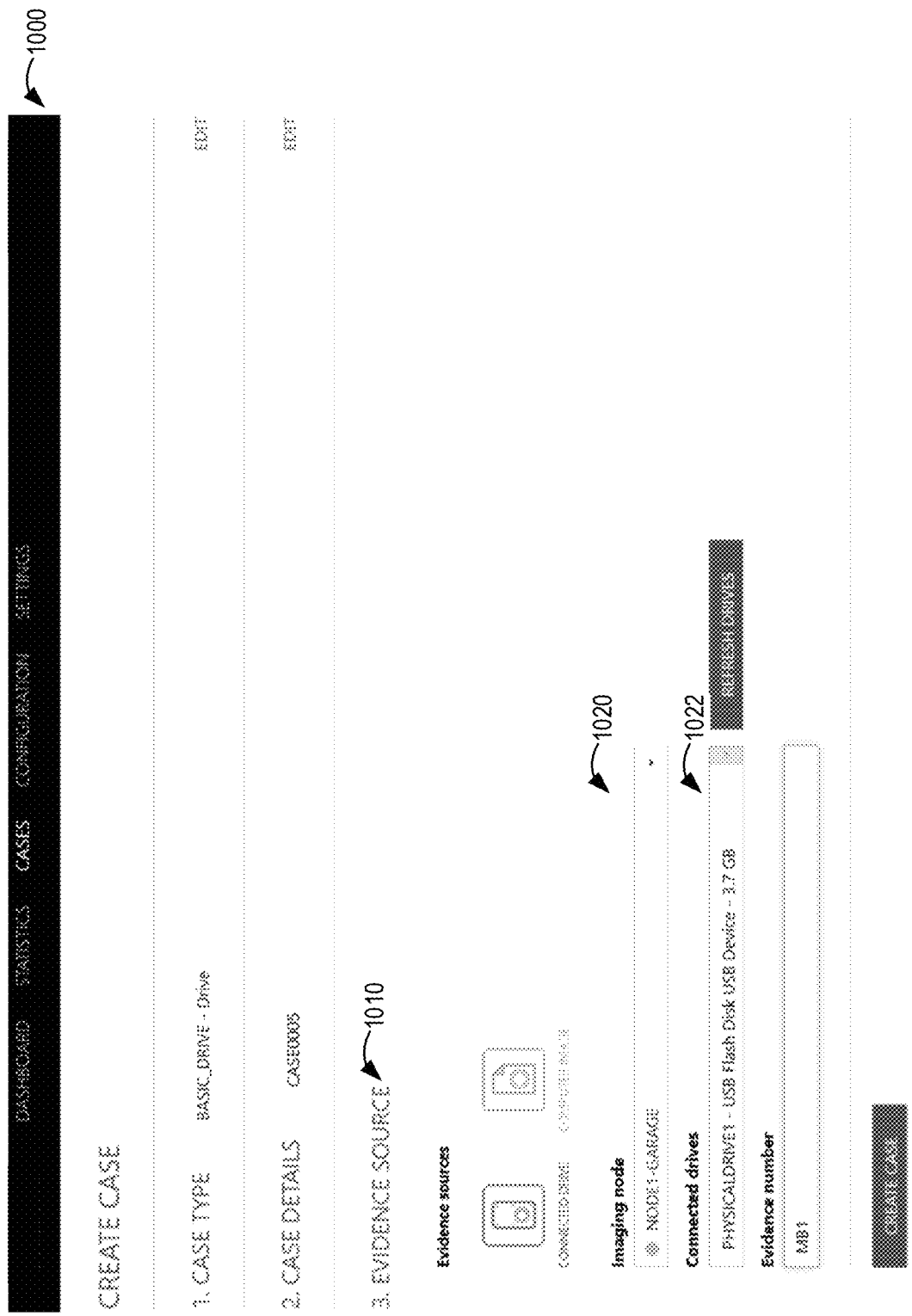
FIG. 11 is a graphical user interface for a forensic data investigation application in accordance with another example embodiment.
Figure 12:
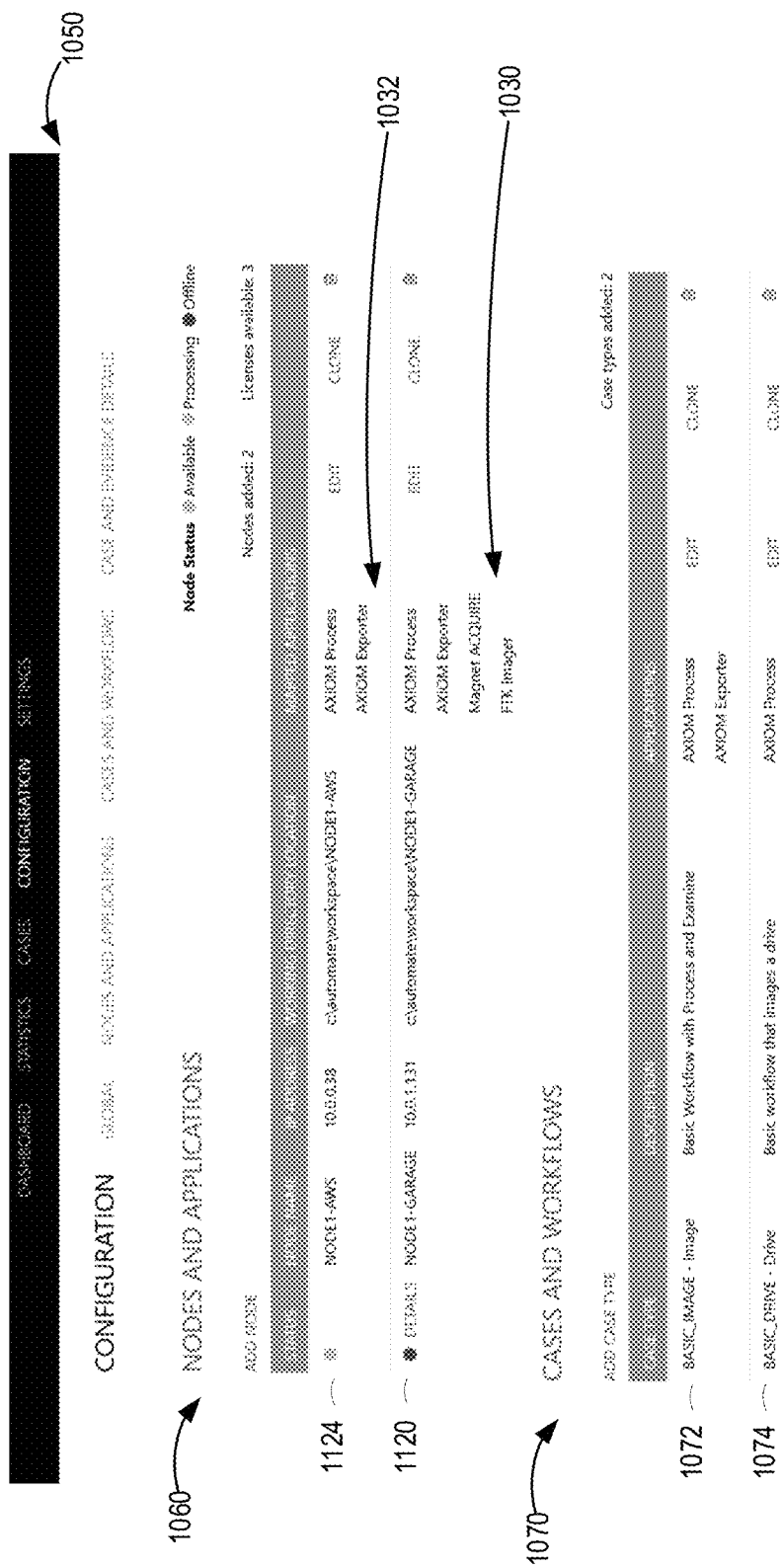
FIG. 12 is a graphical user interface for a forensic data investigation application in accordance with another example embodiment.

The digital forensic data investigation system 600 can be scaled to include fewer or more computing devices, such as, but not limited to, virtual computing devices, physical computing devices or remote computing devices via the virtual private network 602 (e.g., by instantiating fewer or more nodes). Reference will now be made to FIGS. 11 and 12, which are graphical user interfaces 1000 and 1050, respectively, related to the creation of a forensic investigation (or case).

As shown in FIG. 11, an evidence selection field 1010 is provided within the graphical user interface 1000. Via the evidence selection field 1010, the digital forensic data investigation system 600 can receive user selections identifying the relevant agent computing devices 620, 622 to be included in the forensic investigation via node selection field 1020, and also the relevant data storage devices 630 to be included in the forensic investigation via storage device selection field 1022. In some embodiments, it is possible for the digital forensic data investigation system 600 to automatically select one or more agent computing devices 620, 622, and/or one or more data storage devices 630 for a forensic investigation based on aspects of the investigation, such as, but not limited to, type of forensic data, type of investigation, etc.

In FIG. 12, the graphical user interface 1050 includes a node list 1060 that includes the nodes (or agent computing device) available to the forensic investigation. In this example, agent computing device 1124 via the AMAZON WEB SERVICE™ platform and a local physical agent computing 1120 are available. The agent computing device 1124 includes two applications (shown generally at 1032) associated with the investigation workflow 520, and the agent computing device 1120 includes four applications (shown generally at 1030) related to the investigation workflow 520 and acquiring disk images. The graphical user interface 1050 also includes an investigation (case) list 1070 including investigations 1072 and 1074 in this example.

Figure 7:
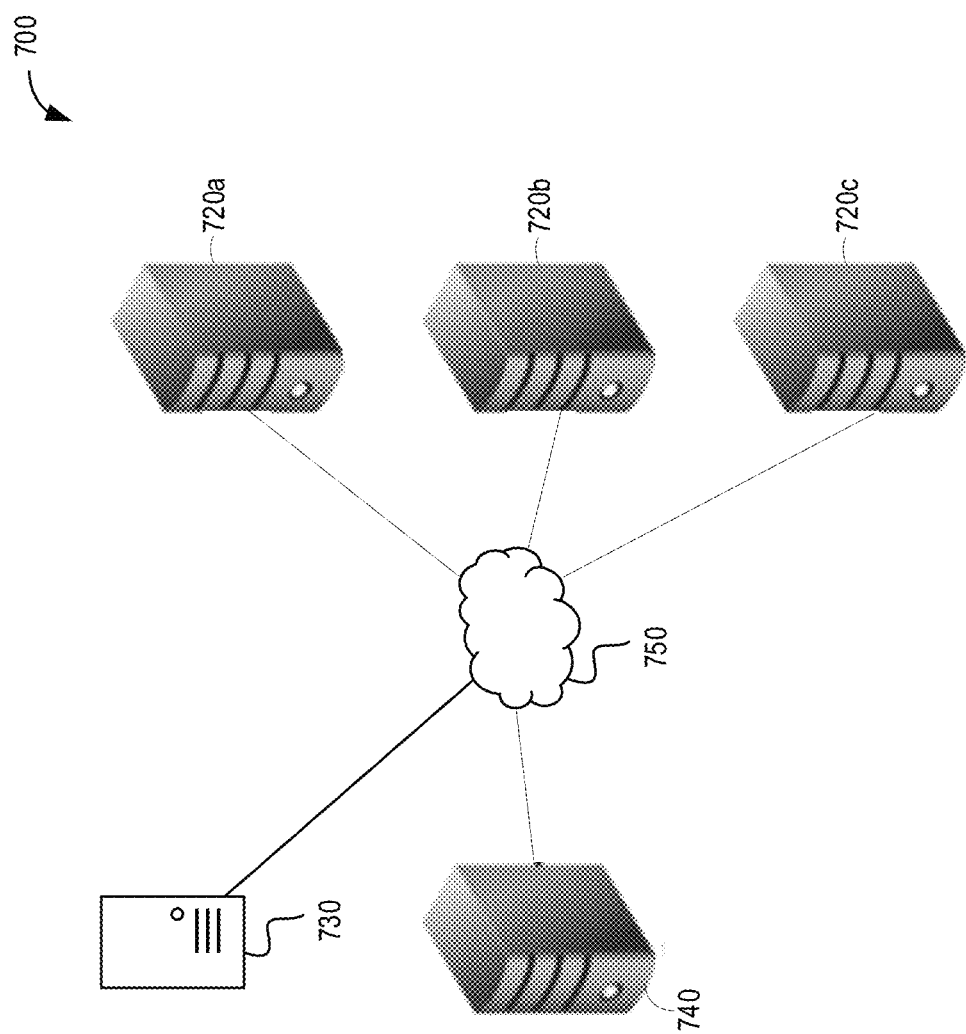
FIG. 7 is a simplified block diagram of another digital forensic data investigation system in accordance with another example embodiment.

Referring now to FIG. 7, there is shown a block diagram of another example embodiment of the digital forensic data investigation system 700.

The digital forensic data investigation system 700 includes a central computing device 740 that can communicate with agent computing devices 720a, 720b, 720c via a data communication network 750, which can be include a private data communication network and/or public data communication network. The agent computing devices 720a, 720b, 720c can include physical computing devices for collecting and/or processing forensic data, and can store the results at the data storage device 730 via the data communication network 750.

The central computing device 740 can operate the agent computing devices 720a, 720b, 720c to complete the investigation workflow 520, for example. Agent computing device 720a can operate to generate a disk image from a hard drive at a remote location, and store the disk image at the data storage device 730 via the data communication network 750. Agent computing devices 720b and 720c can proceed to conduct the investigation workflow 520 on the disk image, and store the results of the investigation to the data storage device 730. Each of the agent computing devices 720a, 720b, 720c can store the disk image, or relevant portions of the disk image, locally.

Figure 8:
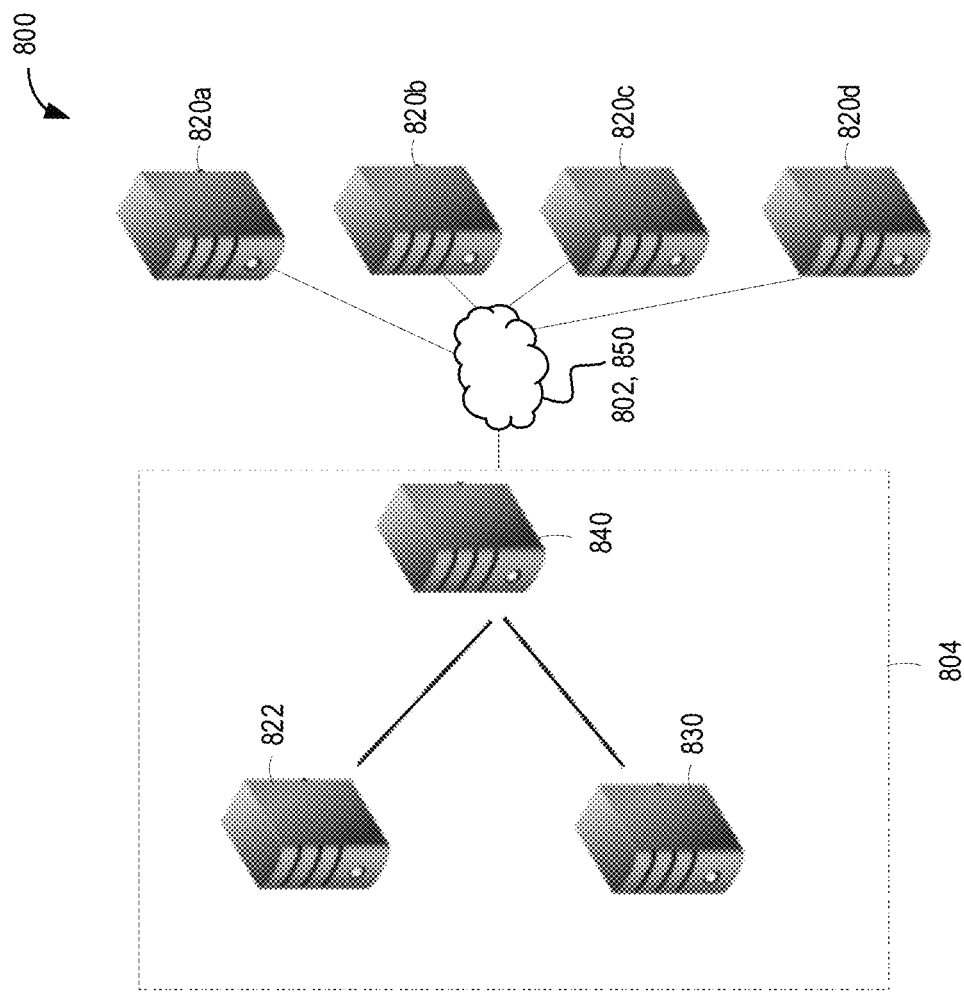
FIG. 8 is a simplified block diagram of another digital forensic data investigation system in accordance with another example embodiment.

Referring now to FIG. 8, there is shown a block diagram of another example embodiment of the digital forensic data investigation system 800.

The digital forensic data investigation system 800 includes a central computing device 840 that can manage the operation of the agent computing devices 822, 820a, 820b, 820c, 820d. The agent computing device 822, for example, can be a virtual computing device in communication with the central computing device 840. The agent computing devices 820a, 820b, 820c, 820d can include virtual computing devices in communication with the central computing device 840 via a virtual private network 802, and/or physical computing devices in communication with the central computing device 840 via a private or public data communication network 850.

As described with reference to FIGS. 6 and 7, the central computing device 840 can operate the agent computing devices 822, 820a, 820b, 820c, 820d for conducting the investigation workflow 520. In some embodiments, fewer or more agent computing devices can be used, depending on various aspects of the investigation workflow 520, such as, but not limited to, urgency, amount of forensic data, overall workload required of the digital forensic data investigation system 800, etc.

For example, agent computing device 820a can include a kiosk computing device operable for collecting disk images and/or other digital forensic data at a port of entry. The agent computing device 820a can collect the digital forensic data and store the digital forensic data into the data storage device 830 via the data communication network 850. The digital forensic data can be accessed by the agent computing device 822 via a local data communication network, as well as via the data communication network 850 by agent computing devices 820c and 820d, for example, for conducting the investigation workflow 520. By distributing the processing required, the central computing device 840 can maximize the available processing resources and improve the rate at which digital forensic data can be analyzed.

In some embodiments, the central computing device 840 can assign an agent computing device, such as 822, with hybrid roles. For example, the central computing device 840 can assign a stage of the investigation workflow 520 to a portion of the processing resource at the agent computing device 822, and retain the remaining portion of the processing resource for use by investigators in reviewing the forensic data. A virtual machine can be installed at the agent computing device 822 for conducting the investigation workflow 520 with the restricted processing resource. This can assist with maximizing available resources, while also minimizing any performance degradation to either tasks at the agent computing device 822.

Figure 13:
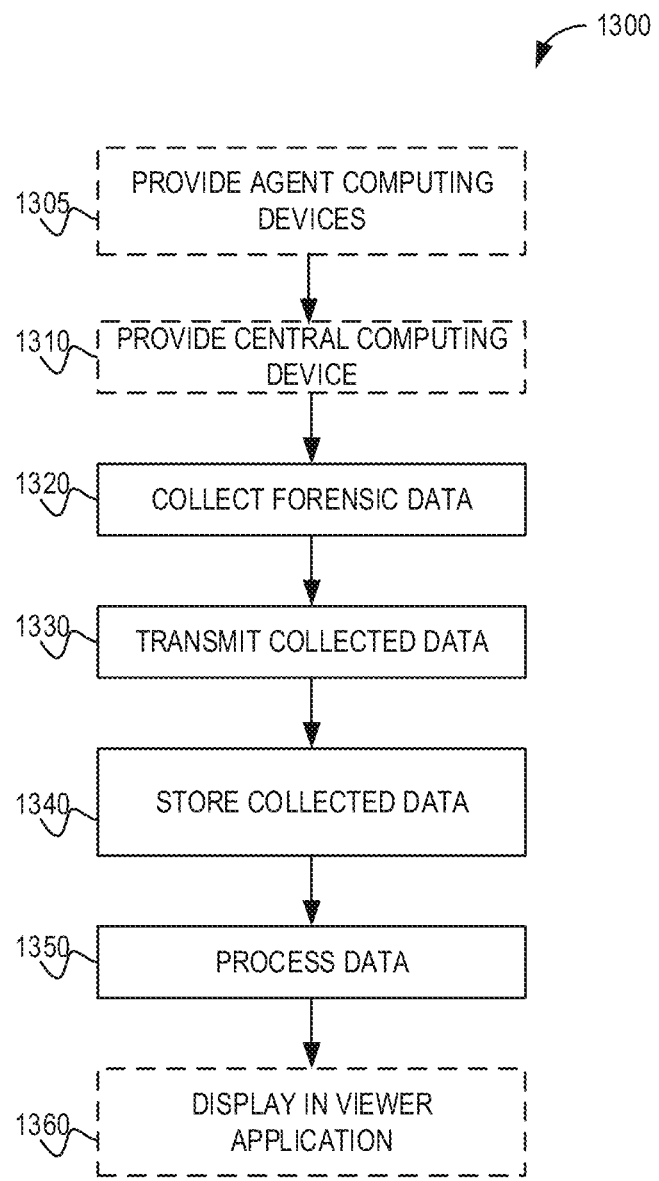
FIG. 13 is a process flow diagram for an example method of conducting distributed digital forensic processing in accordance with at least some embodiments.

Referring now to FIG. 13, there is illustrated a process flow diagram for an example method of conducting distributed digital forensic processing in accordance with at least some embodiments. Method 1300 may be carried out, for example, by the computing devices of system 100 and/or 600.

Method 1300 begins, for example, by providing one or more agent computing devices, as described herein, at 1305, and a central computing device at 1310. The central computing device is generally operable to communicate with the one or more agent computing devices via at least one data communication network, such as the Internet. In some cases, the method may involve allocating the one or more agent computing devices based on a priority status of a forensic investigation.

In some cases, the method may involve preconfiguring the at least one data-collecting agent device to collect the digital forensic data from a target device, as described herein. For example, preconfiguring may involve identifying a remote computing device to collect the data. In another example, preconfiguring may involve identifying a target device and remotely provisioning the target device to install remote data acquisition software to perform the data collection.

At 1320, the method continues to collecting digital forensic data via the at least one data-collecting agent device. As described herein, the digital forensic data may be collected from any one or more of computing device 622, remote computing devices 620a, 620b, 620c, etc. In some cases, such as when a device has been remotely provisioned, the central computing device is operable to transmit one or more commands to the at least one data-collecting agent device to collect the digital forensic data.

At 1330, the at least one data-collecting agent device transmits the collected digital forensic data to another device for storage. For example, the digital forensic data may be transmitted to the central computing device 640 or to the data storage device 630, or to another computing device, such as device 622 or devices 620a to 620c.

At 1340, the method continues to storing the digital forensic data collected by the at least one data-collecting agent device.

At 1350, the method continues to conducting at least a portion of the distributed digital forensic processing on the digital forensic data at at least one processing agent device. The digital forensic processing may be similar to that described elsewhere herein. For example, the digital forensic processing may involve refining to identify and/or extract data artifacts or other data items, which may also be stored in a data storage device. In some cases, the method may involve allocating the one or more processing agent computing devices that will perform the processing based on a priority status, e.g., of a forensic investigation associated with the collected digital forensic data. At 1360, the processed digital forensic data may be provided in a user interface, such as interface 300 of FIG. 3.

Various systems or methods have been described herein to provide an example of embodiments of the claimed subject matter. No embodiment described herein limits any claimed subject matter and any claimed subject matter may cover methods or systems that differ from those described below. The claimed subject matter is not limited to systems or methods having all of the features of any one system or method described below or to features common to multiple or all of the apparatuses or methods described herein. It is possible that a system or method described herein is not an embodiment that is recited in any claimed subject matter. Any subject matter disclosed in a system or method described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++, Java or any other suitable programming language and may comprise modules or classes, as is known to those skilled in computer programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A forensic investigation system for conducting distributed digital forensic processing of a target device, the system comprising:
   one or more agent computing devices comprising:
      at least one data-collecting agent device operable to collect digital forensic data from the target device using a remote data acquisition software application installed on the at least one data-collecting agent device; and
      at least one processing agent device operable to conduct at least a portion of the distributed digital forensic processing on the collected digital forensic data according to an investigation workflow including a digital forensic analysis routine comprising one or more processing tasks, the one or more processing tasks including refining the collected digital forensic data to identify or extract one or more data artifacts;
   a central computing device for managing operation of the one or more agent computing devices for conducting the distributed digital forensic processing, the central computing device operable to communicate with the one or more agent computing devices via at least one data communication network to remotely deploy the remote data acquisition software application to the at least one data-collecting agent device for collecting the digital forensic data from the target device and refining the collected digital forensic data to identify or extract the one or more data artifacts, the central computing device further operable to assign each processing agent device to at least one of the one or more processing tasks, wherein the central computing device triggers each stage of the investigation workflow to occur in a distributed or localized manner based on available processing agent devices; and
   a data storage device for storing the digital forensic data collected by the at least one data-collecting agent device from the target device.

2. The system of claim 1, wherein the central computing device is operable to allocate the one or more agent computing devices based on a priority status of a forensic investigation associated with the collected digital forensic data.

3. The system of claim 1, wherein the at least one data-collecting agent device is preconfigured to collect the digital forensic data from the target device.

4. The system of claim 1, wherein the at least one data-collecting agent device is the target device.

5. The system of claim 1, wherein the at least one data-collecting agent device is remotely provisioned to be operable to collect the digital forensic data.

6. The system of claim 5, wherein, following remote provisioning, the central computing device is operable to transmit one or more commands to the at least one data-collecting agent device to collect the digital forensic data.

7. The system of claim 6, wherein, in response to receiving the one or more commands, the at least one data-collecting agent device is operable to collect the digital forensic data and transmit the digital forensic data.

8. The system of claim 7, wherein the at least one data-collecting agent device transmits the digital forensic data to the central computing device.

9. The system of claim 7, wherein the at least one data-collecting agent device transmits the digital forensic data to the data storage device.

10. The system of claim 1, wherein the one or more agent computing devices further comprise at least one virtual computing device.

11. The system of claim 10, wherein the at least one virtual computing device is accessible by the central computing device via a virtual private network.

12. A method of conducting distributed digital forensic processing of a target device, the method comprising:
providing one or more agent computing devices including at least one data-collecting agent device and at least one processing agent device;
providing a central computing device, the central computing device operable to communicate with the one or more agent computing devices via at least one data communication network, the central computing device further operable to assign each processing agent device to one or more processing tasks, wherein the central computing device triggers each stage of an investigation workflow to occur in a distributed or localized manner based on available processing agent devices;
remotely deploying a remote data acquisition software application from the central computing device to the at least one data-collecting agent device for collecting digital forensic data from the target device and refining the collected digital forensic data to identify or extract one or more data artifacts;
collecting the digital forensic data via the at least one data-collecting agent device using the remote data acquisition software application installed on the at least one data-collecting agent device;
storing the digital forensic data collected by the at least one data-collecting agent device from the target device; and
conducting at least a portion of the distributed digital forensic processing on the collected digital forensic data at the least one processing agent device according to the investigation workflow including a digital forensic analysis routine comprising the one or more processing tasks, the one or more processing tasks including refining the collected digital forensic data to identify or extract the one or more data artifacts.

13. The method of claim 12, further comprising the central computing device allocating the one or more agent computing devices based on a priority status of a forensic investigation associated with the collected digital forensic data.

14. The method of claim 12, further comprising preconfiguring the at least one data-collecting agent device to collect the digital forensic data from the target device.

15. The method of claim 12, wherein the at least one data-collecting agent device is the target device.

16. The method of claim 12, further comprising remotely provisioning the at least one data-collecting agent device to collect the digital forensic data.

17. The method of claim 16, wherein, following remote provisioning, the central computing device is operable to transmit one or more commands to the at least one data-collecting agent device to collect the digital forensic data.

18. The method of claim 17, wherein the at least one data-collecting agent device collects the digital forensic data and transmits the digital forensic data in response to receiving the one or more commands.

19. The method of claim 18, wherein the at least one data-collecting agent device transmits the digital forensic data to the central computing device.

20. The method of claim 18, wherein the at least one data-collecting agent device transmits the digital forensic data to the data storage device.

21. The method of claim 12, wherein the one or more agent computing devices further comprise at least one virtual computing device.

22. A non-transitory computer readable medium storing computer program instructions executable by at least one computer processor, which when executed by the at least one computer processor, cause the at least one computer processor to carry out a method of conducting distributed digital forensic processing of a target device, the method comprising:
providing one or more agent computing devices including at least one data-collecting agent device and at least one processing agent device;
providing a central computing device, the central computing device operable to communicate with the one or more agent computing devices via at least one data communication network, the central computing device further operable to assign each processing agent device to one or more processing tasks, wherein the central computing device triggers each stage of an investigation workflow to occur in a distributed or localized manner based on available processing agent devices;
remotely deploying a remote data acquisition software application from the central computing device to the at least one data-collecting agent device for collecting digital forensic data from the target device and refining the collected digital forensic data to identify or extract one or more data artifacts;
collecting the digital forensic data via the at least one data-collecting agent device using the remote data acquisition software application installed on the at least one data-collecting agent device;
storing the digital forensic data collected by the at least one data-collecting agent device from the target device; and
conducting at least a portion of the distributed digital forensic processing on the collected digital forensic data at the least one processing agent device according to the investigation workflow including a digital forensic analysis routine comprising the one or more processing tasks, the one or more processing tasks including refining the collected digital forensic data to identify or extract the one or more data artifacts.

* * * * *